(12) United States Patent
Kim et al.

(10) Patent No.: US 9,179,468 B2
(45) Date of Patent: *Nov. 3, 2015

(54) METHOD FOR AVOIDING INTER-CELL INTERFERENCE IN WIRELESS ACCESS SYSTEM

(75) Inventors: Hakseong Kim, Anyang-Si (KR); Yoan Shin, Seoul (KR); Ohsoon Shin, Seoul (KR); Mochan Yang, Seoul (KR); Sungcheol Yoo, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

This patent is subject to a terminal disclaimer.

(21) Appl. No.: 13/990,805

(22) PCT Filed: Oct. 6, 2011

(86) PCT No.: PCT/KR2011/007420
§ 371 (c)(1),
(2), (4) Date: May 31, 2013

(87) PCT Pub. No.: WO2012/074192
PCT Pub. Date: Jun. 7, 2012

(65) Prior Publication Data
US 2013/0242855 A1 Sep. 19, 2013

Related U.S. Application Data

(60) Provisional application No. 61/419,233, filed on Dec. 2, 2010, provisional application No. 61/440,874, filed on Feb. 9, 2011.

(51) Int. Cl.
*H04W 72/08* (2009.01)
*H04J 11/00* (2006.01)
(Continued)

(52) U.S. Cl.
CPC ........... *H04W 72/082* (2013.01); *H04J 11/005* (2013.01); *H04L 1/1607* (2013.01);
(Continued)

(58) Field of Classification Search
CPC ........... H04J 11/005; H04L 2001/0097; H04L 5/0035; H04L 5/0055; H04L 5/0073; H04L 5/0094; H04W 72/0446; H04W 72/082
See application file for complete search history.

(56) References Cited

U.S. PATENT DOCUMENTS

2009/0185521 A1  7/2009  Li et al.
2011/0141901 A1*  6/2011  Luo et al. .................. 370/241
(Continued)

FOREIGN PATENT DOCUMENTS

KR  10-2010-0110731 A  10/2010

*Primary Examiner* — David Oveissi
(74) *Attorney, Agent, or Firm* — Birch, Stewart, Kolasch & Birch, LLP

(57) ABSTRACT

According to the disclosure of the present invention, provided is a method for operating a relay node (RN) to avoid an inter-cell interference (ICI) in a wireless access system. The method includes: overhearing the downlink signal transmitted by a plurality of base stations to terminals within the coverage area of each base station in an $n^{th}$ subframe; decoding the overheard downlink signal from an $n+1^{th}$ subframe to an $n+3^{th}$ subframe and sharing the RN through the plurality of base stations; overhearing the reply to the downlink signal transmitted by the terminals to each base station in an $n+4^{th}$ subframe; reallocating a resource block allocated to the terminals in the $n^{th}$ subframe if there is at least one negative reply NACK in the replies to the downlink signal transmitted by the terminals; and transmitting control information representing the reallocated resource block to each base station.

15 Claims, 26 Drawing Sheets

(51) Int. Cl.
  H04L 1/16    (2006.01)
  H04L 1/18    (2006.01)
  *H04B 7/26*    (2006.01)
  *H04L 5/00*    (2006.01)
  *H04L 1/00*    (2006.01)
  *H04W 72/04*   (2009.01)

(52) U.S. Cl.
  CPC ............ H04L1/1854 (2013.01); H04L 5/0035 (2013.01); H04L 5/0055 (2013.01); H04L 5/0073 (2013.01); *H04B 7/2656* (2013.01); *H04L 5/0023* (2013.01); *H04L 5/0094* (2013.01); *H04L 2001/0093* (2013.01); *H04L 2001/0097* (2013.01); *H04W 72/0446* (2013.01)

(56) References Cited

U.S. PATENT DOCUMENTS

| | | | |
|---|---|---|---|
| 2011/0280174 A1* | 11/2011 | Li et al. | 370/315 |
| 2012/0020279 A1 | 1/2012 | Kim et al. | |
| 2012/0156984 A1* | 6/2012 | Gan et al. | 455/7 |
| 2013/0064197 A1* | 3/2013 | Novak et al. | 370/329 |
| 2013/0223257 A1* | 8/2013 | Balercia et al. | 370/252 |
| 2014/0056206 A1* | 2/2014 | Higuchi et al. | 370/312 |

\* cited by examiner

Interference

Collision resource (800)

Collision resource (800)

Collision resource (800)

RBs allocated to UE outside SRN (910)
RBs allocated to UE in SRN (920)
Collision RB (930)

⊠ :RB allocated for UEs which eNB1 in SRN block serves (1210)
▦ :RB allocated for UEs which eNB2 in SRN block serves (1220)
▥ :RB allocated for UEs which eNB3 in SRN block serves (1230)

METHOD FOR AVOIDING INTER-CELL INTERFERENCE IN WIRELESS ACCESS SYSTEM

CROSS REFERENCE TO RELATED APPLICATIONS

This application is the National Phase of PCT/KR2011/007420 filed on Oct. 6, 2011 which claims priority under 35 U.S.C. 119(e) to U.S. Provisional Application Nos. 61/419,233 filed on Dec. 2, 2010 and 61/440,874 filed on Feb. 9, 2011, all of which are hereby expressly incorporated by reference into the present application.

FIELD OF THE INVENTION

The present invention relates to a wireless access system, and more particularly to a method for avoiding inter-cell interference (ICI) in downlink.

BACKGROUND OF THE INVENTION

3rd Generation Partnership Project Long Term Evolution-Advanced (3GPP LTE-A) is a standard of a next generation mobile communication system by installing an RN in a shadow area and a cell boundary area, and supports a Multi Hop relay transmission technology capable of providing a high transmission rate to user.

Further, an Orthogonal Frequency-Division Multiple Access (OFDMA) technology is a modulation/demodulation scheme to prevent the multipath fading in a wireless channel, and may be advantageous to flexibly allocate time, frequency, and power resources to a plurality of users using a plurality of sub-carriers.

When considering only a single cell, since each resource does not have limitations in external interference, resource allocation (RA) using an OFDMA scheme represents improved efficiency. However, when adjacent cells in an actual multi-cell use the same frequency resource, interference is significantly created.

In order to solve the above problem, a scheme of varying a frequency reuse pattern in a cell and a cell boundary zone has been suggested. However, since a frequency is allocated to a plurality of divided zones of each cell, efficiency is deteriorated in a frequency use side.

BRIEF SUMMARY OF THE INVENTION

The present invention provides a method of reallocating a collision resource in an RN coverage area to avoid ICI while implementing a full dynamic RA scheme for each cell. The present invention efficiently performs a hybrid automatic repeat request (HARQ) process in downlink through the foregoing method.

In order to achieve the objects as described above, there is provided a method for operating a relay node (RN) to avoid inter-cell interference (ICI) in a wireless access system, comprising: overhearing a downlink signal transmitted by a plurality of base stations to terminals within a coverage area of each base station in an nth sub-frame; decoding the overheard downlink signal from an $n+1^{st}$ sub-frame to an $n+3^{rd}$ sub-frame and sharing the RN through the plurality of base stations; where n is an integer greater than 0; overhearing a response to the downlink signal transmitted by the terminals to each base station in an $n+4^{th}$ sub-frame; reallocating a resource block allocated to the terminals in the nth sub-frame if there is at least one negative acknowledgement (NACK) in the responses to the downlink signal transmitted by the terminals, wherein the response is a positive acknowledgement (ACK) or the NACK; generating control information representing the reallocated resource block; transmitting control information representing the reallocated resource block to each base station; and transmitting, in an $n+8^{th}$ sub-frame, the downlink signal transmitted to the terminals in the nth sub-frame, in accordance with the control information.

The transmitting of the control information to each base station comprises: comparing resource blocks allocated to terminals within a coverage area of the RN through the downlink signal with each other to determine whether a collision resource block is included in the resource blocks; and if it is determined that the collision block is included in the resource blocks, reallocating a resource to the collision resource block.

The reallocating of the resource may comprise exchanging the collision resource block for resource blocks to be allocated to terminals outside the coverage area of the RN.

The plurality of base stations may comprise three base stations, and the RN comprises a shared RN (SRN) shared by the three base stations.

The downlink signal transmitted in the nth sub-frame may comprise a physical downlink control channel (PDCCH) and a physical downlink shared channel (PDSCH).

The downlink signal transmitted to the terminals in the $n^{th}$ sub-frame may comprise a physical downlink shared channel (PDSCH).

The relay node may communicate with the plurality of base stations using X2 signaling.

In order to achieve the objects as described above, according to another disclosure, there is a method for operating a relay node (RN) to avoid inter-cell interference (ICI) in a wireless access system comprising: transmitting a downlink signal to a terminal within a coverage area of the base station in an $n^{th}$ sub-frame; receiving a response to the downlink signal from the terminal in an $n+4^{th}$ sub-frame, wherein the response is a positive acknowledgement (ACK) or a negative acknowledgement (NACK); receiving control information representing that a procedure of reallocating a resource to the terminal transmitting the acknowledgement NACK to the downlink signal is required from the relay node; reallocating a resource block allocated in the $n^{th}$ sub-frame to the terminal transmitting the NACK to the downlink signal based on the received control information; and retransmitting, in an $n+8^{th}$ sub-frame, the downlink signal transmitted to the terminal in the $n^{th}$ sub-frame, according to the reallocated resource block. The RN is configured to overhear the response to the downlink signal transmitted by the terminal and generate the control information if the response is the NACK.

The reallocating of the resource block allocated in the $n^{th}$ sub-frame may comprise: comparing resource blocks allocated to terminals within a coverage area of the RN through the downlink signal with each other to determine whether a collision resource block is included in the resource blocks; and if it is determined that the collision block is included in the resource blocks, reallocating a resource to the collision resource block.

The reallocating of the resource may comprise exchanging the collision resource block for resource blocks to be allocated to terminals outside the coverage area of the relay node.

The exchanging of the collision resource block may comprise: comparing a Signal-to-Interference plus Noise Ratio (SINR) of the collision resource block with SINRs of the resource blocks to be allocated to terminals outside the coverage area of the RN, respectively; and determining a resource block having a smallest difference between the SINRs as a resource block to be exchanged.

The RN may comprise a shared RN (SRN) shared by a plurality of base stations.

The downlink signal transmitted in the $n^{th}$ sub-frame may comprise a physical downlink control channel (PDCCH) and a physical downlink shared channel (PDSCH).

The downlink signal transmitted to the terminals in the $n^{th}$ sub-frame may comprise a physical downlink shared channel (PDSCH).

In the present invention, when resource blocks allocated to terminals within a share RN collide with each other while the shared RN overhears a downlink signal or an uplink signal transmitted from the base station to the terminal, ICI can be avoided by reallocating a resource with respect to the collided resource blocks.

DETAILED DESCRIPTION OF THE INVENTION

Hereinafter, exemplary embodiments of the present invention are described with reference to the accompanying drawings in detail. A detailed description disclosed together with accompanying drawings illustrates an exemplary embodiment of the present invention, but is not a unique embodiment of the present invention.

The following detailed description includes concrete contents to provide perfect understanding of the present invention. However, it will be obvious to those skilled in the art that the present invention may be implemented without the concrete contents. For example, the following embodiment will be made on the assumption that a mobile communication system is a 3GPP LTE system, but contents of a 3GPP LTE except for specific contents are applicable to other mobile communication systems.

In some cases, detailed descriptions of well-known functions and structures incorporated herein may be omitted to avoid obscuring the subject matter of the present invention. The same reference numbers are used throughout the drawings to refer to the same or like parts.

Further, hereinafter, it is assumed that mobile or fixed user end devices such as User Equipment (UE), a Mobile Station (MS), an Advanced Mobile Station (AMS) is referred to as 'terminal'. Further, a predetermined node of a network end such as Node B, eNode B, Base Station, an Access Point (AP) communicating with the terminal is referred to as 'base station'. A repeater may variously refer to a Relay Node (RN), a Relay Station (RS), and a relay.

In the mobile communications system, the terminal and the repeater may receive information from the base station through a downlink, and the terminal and the repeater may transmit the information through an uplink. The information transmitted or received by the terminal and the repeater includes data and various control information, and various physical channels are provided according to a type and an application of the information received or transmitted by the terminal and the repeater.

Figure 1:
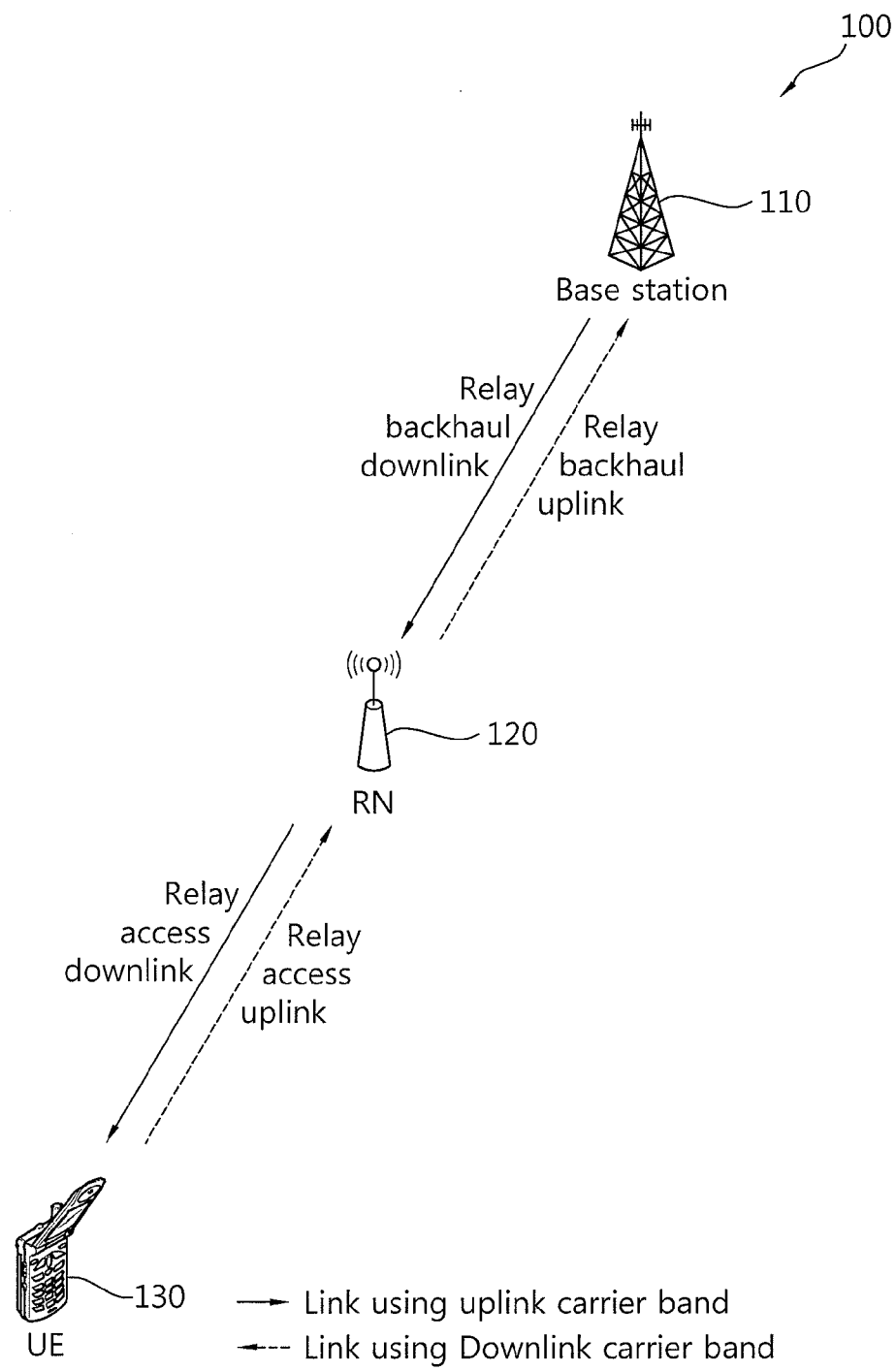
FIG. 1 is a diagram illustrating a configuration of a relay backhaul link and a relay access link in a wireless communication system 100 according to an embodiment of the present invention.

FIG. 1 is a diagram illustrating a configuration of a relay backhaul link and a relay access link in a wireless communication system 100 according to an embodiment of the present invention.

In the 3GPP LTE-A, a relay node (RN) 120 forwards link connection between a base station 110 and a terminal 130 so that two types of links having different attributes are applied to uplink and downlink carrier frequency bands, respectively. A connection link part set at a link between the base station and the RB is defined as a backhaul link. A link where transmission is achieved in a Frequency Division Duplex (FDD) scheme or a Time Division Duplex (TDD) scheme using a downlink resource may refer to a backhaul downlink and a link where transmission is achieved in the FDD scheme or the TDD scheme using an uplink resource may refer to a backhaul uplink.

Meanwhile, a connection link part set between the RN and terminals is defined as a relay access link. When transmission is achieved using a downlink frequency band (case of FDD) or a downlink sub-frame (case of TDD), the relay access link is expressed as an access downlink. When transmission is achieved using an uplink frequency band (case of FDD) or an uplink sub-frame (case of TDD), the relay access link is expressed as an access uplink.

The RN may receive information from the base station through a relay backhaul downlink, and may transmit information to the base station through a relay backhaul Further, the RN may transmit information to the terminal through the relay access downlink, and may information from the terminal through the relay access uplink.

The RN may perform an initial cell search operation such as an operation of synchronizing with the base station. To this end, the RN may receive a synchronous channel from the base station to synchronize with the base station, and may acquire information such as a cell ID. Next, the RN may receive a physical broadcast channel from the base station to acquire broadcast information in the cell. Meanwhile, the RN may receive a backhaul downlink reference signal in the initial cell search step to confirm a channel state of the relay backhaul downlink. The RN may receive a Relay-Physical Downlink Control Channel (R-PDCCH) and/or a Relay-Physical Downlink Shared Channel (R-PDSCH) to acquire detailed system information.

Meanwhile, when there is no wireless resource for firstly accessing the base station or for signal transmission, the RN may perform a random access procedure with the base station. To this end, the RN may transmit a preamble through a Physical Random Access Channel (PRACH), and may receive a response message with respect to the random access procedure through an R-PDCCH and an R-PDSCH corresponding thereto.

In a case of competition based random access except for handover, a contention resolution procedure such as additional transmission of a physical random access channel and R-PDCCH/R-PDSCH may be performed.

The RN having performed the foregoing procedure may perform transmission of R-PDCCH/R-PDSCH and Relay-Physical Uplink Shared Channel (R-PUSCH)/Relay-Physical Uplink Control Channel (R-PUCCH), which is a general uplink/downlink signal transmission procedure.

In this case, the control information transmitted to the base station through the uplink by the RN or received from the RN by the base station may include ACK/NACK signal, a Channel Quality Indicator (CQI), a Precoding Matrix Index (PMI), and a Rank Indicator (RI). In a case of the 3GPP LTE-A system, the RN may transmit the control information such as CQI, PMI, and RI through R-PUSCH/R-PUCCH.

Figure 2:
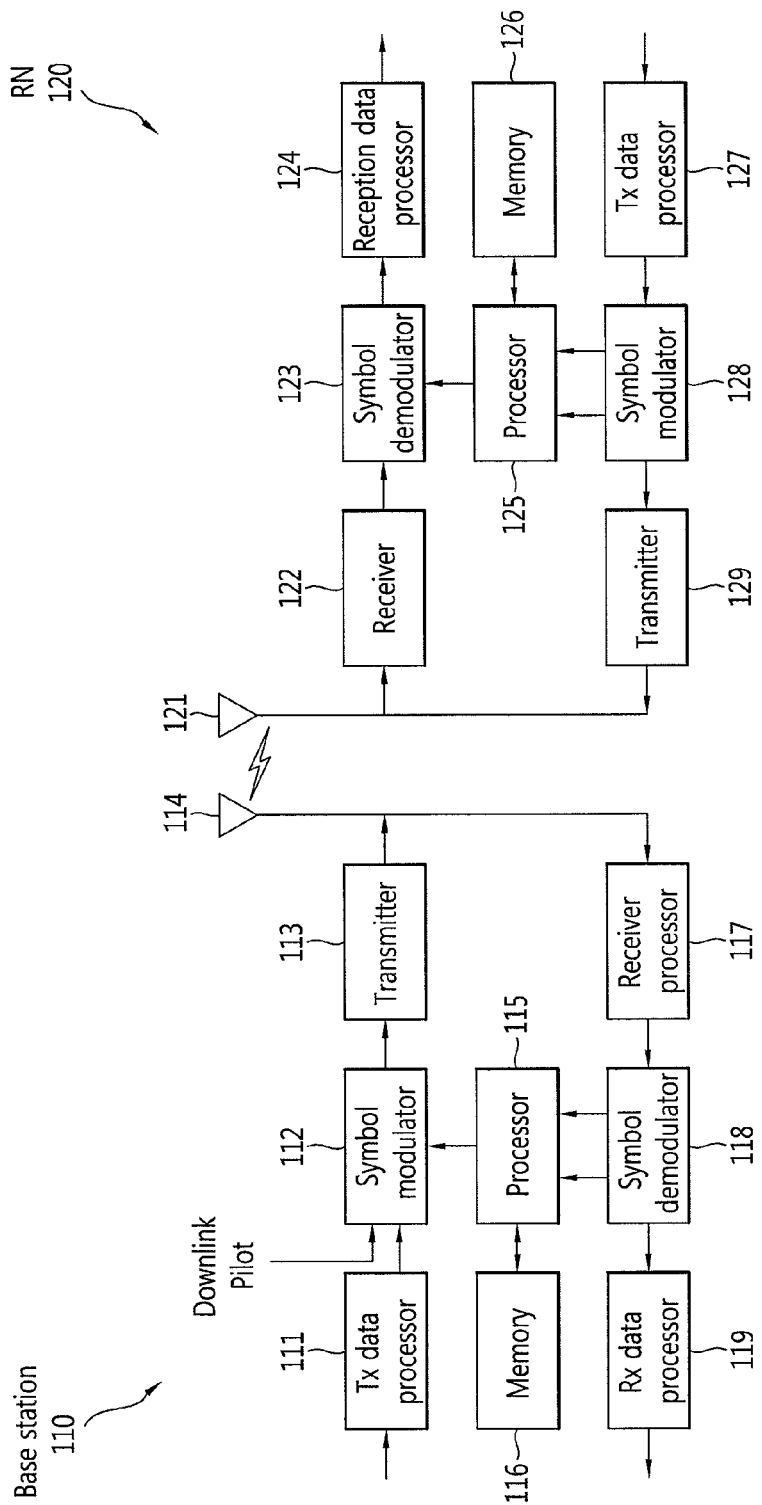
FIG. 2 is a block diagram illustrating a base station 110 and an RN 120 in a wireless communication system 100 according to an embodiment of the present invention.

FIG. 2 is a block diagram illustrating a base station 110 and an RN 120 in a wireless communication system 100 according to an embodiment of the present invention.

Although only one base station 110 and one RN 120 are illustrated in order to simplify the wireless communication system 100, the wireless communication system 100 may include at least one base station and/or at least one RN.

Referring to FIG. 2, the base station 110 may include a transmission Tx data processor 111, a symbol modulator 112, a transmitter 113, a transcription antenna 114, a processor, a memory 116, a receiver 117, a symbol demodulator 118, and a reception Rx data processor 119.

The transmitter 113 and the receiver 117 may constitute a radio frequency (RF) communication unit.

The RN 120 may include a transmission Tx data processor 127, a symbol modulator 128, a transmitter 129, a transception antenna 121, a processor 125, a memory 126, a receiver 122, a symbol demodulator 123, and a reception data processor 124. Although it has been illustrated in the FIG. 2 that the base station 110 includes one antenna 114 and the RN 120 includes one antenna 121, the base station 110 and the RN 120 may include a plurality of antennas, respectively. In the same manner, the transmitter 129 and the receiver 122 may constitute a radio frequency (RF) communication unit.

Accordingly, the base station 110 and the RN 120 according to the present invention support a Multiple Input Multiple Output (MIMO) system. The base station 110 according to the present invention may support both of a Single User-MIMO (SU-MIMO) scheme and a Multi User-MIMO (MU-MIMO) scheme.

In the down link, the transmission data processor 111 receives traffic data, formats and codes the received traffic data, and interleaves and modulates (or symbol-maps) the coded traffic data to provide modulation symbols ("data symbols"). The symbol modulator 112 receives and processes the data symbols and pilot symbols to provide a stream of symbols.

The symbol modulator 112 multiplexes the data symbols and the pilot symbols and transmits the multiplexed symbols to the transmitter 113. In this case, the multiplexed symbols may include a data symbol, a pilot symbol, or a signal value of null. At respective symbol periods, the pilot symbols may be continuously transmitted. The pilot symbols may include a Frequency Division Multiplexing (FDM) symbol, an Orthogonal Frequency Division Multiplexing (OFDM) symbol, a Time Division Multiplexing (TDM) symbol, or a Code Division Multiplexing (CDM) symbol.

The transmitter 113 converts the stream of the symbols into at least one analog signal, and additionally control (e.g., amplify, filter, frequency up-convert) the at least one analog signal to a downlink signal suitable for transmission through a wireless channel. Next, the downlink signal is transmitted to the RN 120 through the antenna 114.

In a configuration of the RN 120, the antenna 121 receives the downlink signal and provides the received the downlink signal to the receiver 122. The receiver 122 controls (e.g., filters, amplifies, and frequency down-converts) the received signal, and digitalizes the controlled signal to acquire samples. The symbol demodulator 123 demodulates received pilot symbols and provides the demodulated pilot symbols to the processor 125 to estimate a channel.

Further, the symbol demodulator 123 receives a frequency response estimation value with respect to downlink from the processor 125, perform data demodulation with respect to the receive data symbols to acquire a data symbol estimation value (estimation values of transmitted data symbols), and provides the data symbol estimation values to the reception Rx data processor 124. The reception data processor 124 demodulates (that is, de-maps) and deinterleaves the data symbol estimation values to restore transmitted traffic data.

Processing by the symbol demodulator 123 and the reception data processor 124 is complementary to processing by the symbol modulator 112 and the transmission data processor 111 in the base station 110.

In the uplink, the transmission data processor 127 of the RN 120 processes traffic data to provide data symbols. The symbol modulator 128 may receive and multiplexes data symbols, modulates the multiplexed data to provide a stream of symbols to the transmitter 129. The transmitter 129 receives and processes the stream of the symbols to generate an uplink signal, and transmits the uplink signal to the base station 110 through the antenna 121.

In the base station 110, the receiver 117 receives and processes the uplink signal from the RN 120 through the antenna 114 to acquire samples. The symbol demodulator 118 processes the samples to provide pilot symbols and a data symbol estimation value with respect to the uplink. The reception data processor 119 processes the data symbol estimation value to restore the traffic data provided from the RN 120.

The processors 115 and 125 of the RN 120 and the base station 110 instruct (e.g., control, adjust, manage, and the like) operations of the RN 120 and the base station 110, respectively. The processors 115 and 125 may be connected to memories 116 and 126 storing program codes and data, respectively. The memories 116 and 126 are connected to the processors 115 and 125 to store an operating system, an application, and general files.

The processors 115 and 125 may refer to a controller, a microcontroller, a microprocessor, or a microcomputer.

Meanwhile, the processors 115 and 125 may be implemented by hardware, firmware, or a combination thereof. When implementing the embodiment of the present invention using the hardware, the processors 115 and 125 may include application specific integrated circuits (ASICs), digital signal processors (DSPs), digital signal processing devices (DSPDs), programmable logic devices (PLDs), and field programmable gate arrays (FPGAs).

Meanwhile, when implementing embodiments of the present invention using the firmware or software, the firmware or the software may be configured to include a module, a procedure, or a function performing functions or operations of the present invention. The firmware or the software configured to perform the present invention is included in the processors 115 and 125 or is stored in the memories 116 and 126 to be driven by the processors 115 and 125, respectively.

Layers of a wireless interface protocol between a wireless communication system (network) including the RN and the base station may be classified into a first layer L1, a second layer L2, and a third layer L3 based on three lower layers of an open system interconnection (OSI) model generally known in a communication system. A physical layer is included in the first layer, and provides an information transmission service through a physical channel. A Radio Resource Control (RRC) layer is included in the third layer and provides control wireless resources between a UE and the network. The RN and the base station may exchange RRC message through a wireless communication network and the RRC layer.

Figure 3:
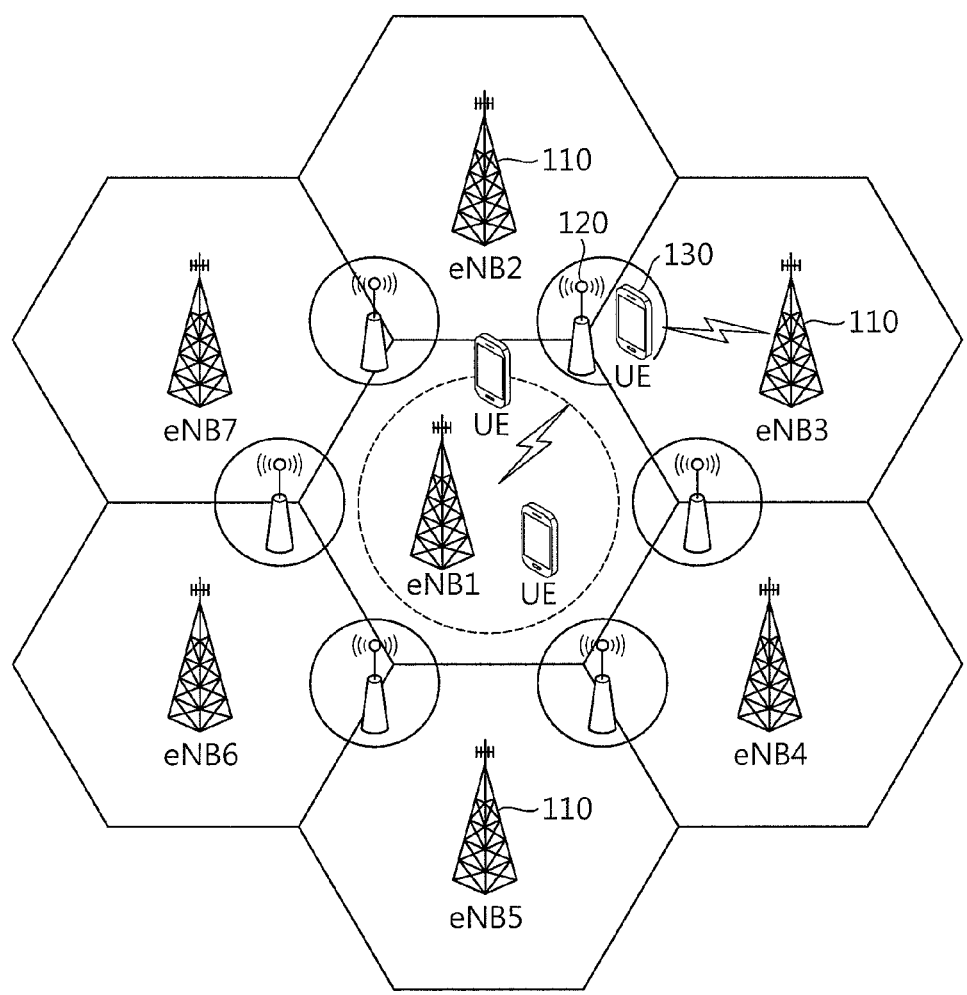
FIG. 3 is a diagram illustrating a structure of a multi-cell shared relay according to an embodiment of the present invention.

FIG. 3 is a diagram illustrating a structure of a multi-cell shared relay according to an embodiment of the present invention.

As illustrated in FIG. 3, a method for avoiding ICI based on a shared relay node (SRN) according to the present invention uses a network basic structure base on SRN where three base stations (enhanced Node-B:eNB) 110 share one SRN 120. Further, it is assumed that the three eNBs 110 provide the SRN assumes Full Frequency Reuse (FFR).

Referring to FIG. 3, the SRN is located at the center of three independent cells and retransmits data for improving throughput of a cell boundary zone which is a basic function of a relay. Further, the SRN overhears a downlink signal from each base station and controls such that interference between terminals deteriorating performance in a cell boundary zone may be avoided. A detailed method thereof will be described later.

The SRN is functionally similar to a Type II RN and supports more functions than that of the Type II RN in a sharing side of a control signal. That is, the SRN according to the present invention has following 1 to 12 characteristics.

1. The SRN does have a separate cell ID, and does not create a new cell.

2. The SRN may transmit a PDSCH (that is, may perform a function of relaying Rel-8 UEs).

3. Rel-8 UEs do not recognize presence of the SRN.

4. The SRN can transmit control (PDCCH, PUCCH) information to eNBs through X2 signaling but cannot transmit the control (PDCCH, PUCCH, and the like) information to UEs. (however, the SRN may transmit a PDCCH signal without interference in a non-cooperative mode)

5. The SRN may restore the control (PDCCH, PUCCH, and the like) information.

6. The SRN newly defines X2 signaling for sharing the control information with the eNB.

7. The SRN performs a relay function with respect to only UEs overhearing downlink and uplink signals of eNBs-UEs.

8. The SRN has a function of discriminating a UE which is located at a zone of the SRN in order to adjust ICI:
has a function of overhearing Uplink Sounding Reference Signal (SRS) of UEs to determine a UE as a UE in a zone of the SRN based on a predetermined threshold.

9. The SRN overhears the Uplink SRS to measure a channel of the signal and to change an MSC level.

The SRN overhears a plurality of eNBs→UEs DL signals to share PDCCH and PDSCH information.

11. The SRN overhears UEs→eNBs UL signal existing at a zone of the SRN to share the PUCCH and PUSCH information.

12. The SRN manages the ICI using shared information by the methods 10 and 11. The management of the ICI refers to all possible methods using data obtained by the methods 10 and 11.

That is, the present invention provides a method where an SRN rather than eNBs becomes a core of a cluster, shares control information of eNBs, discriminates UEs in which ICI occurs in a cell boundary to reallocate a resource for directly avoiding ICI.

Figure 4A:
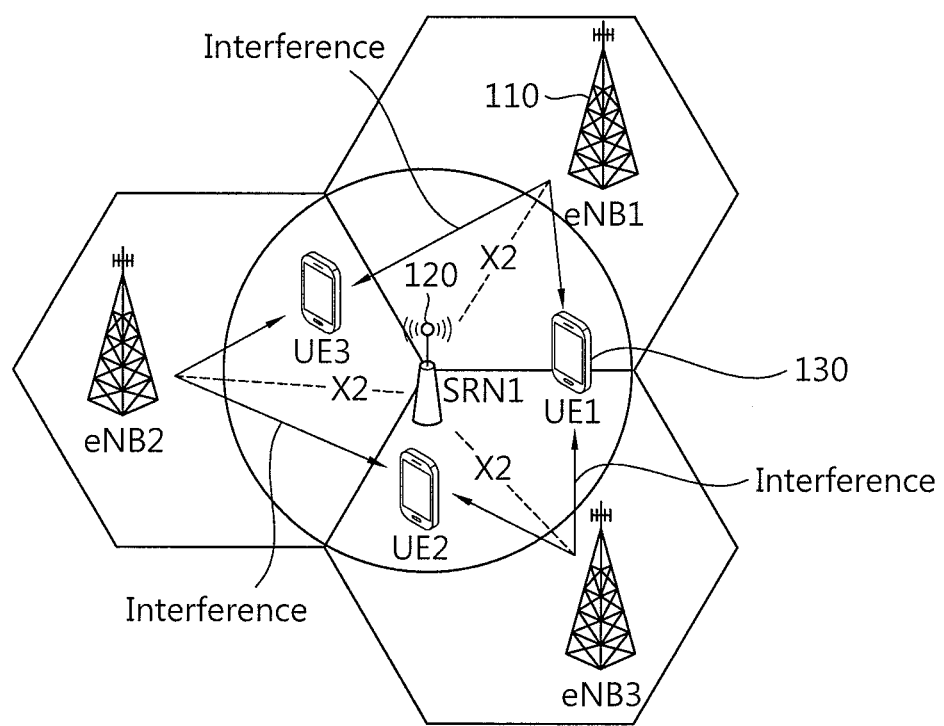
FIGS. 4a to 4c are diagrams illustrating a case where ICI occurs in a network structure based on the SRN.
Figure 4B:
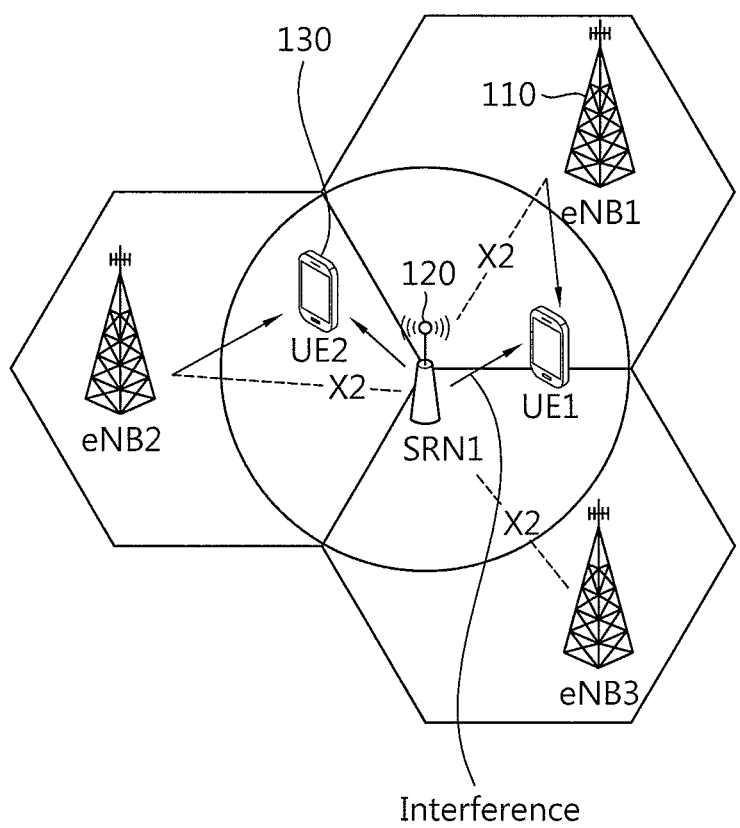
Figure 4C:
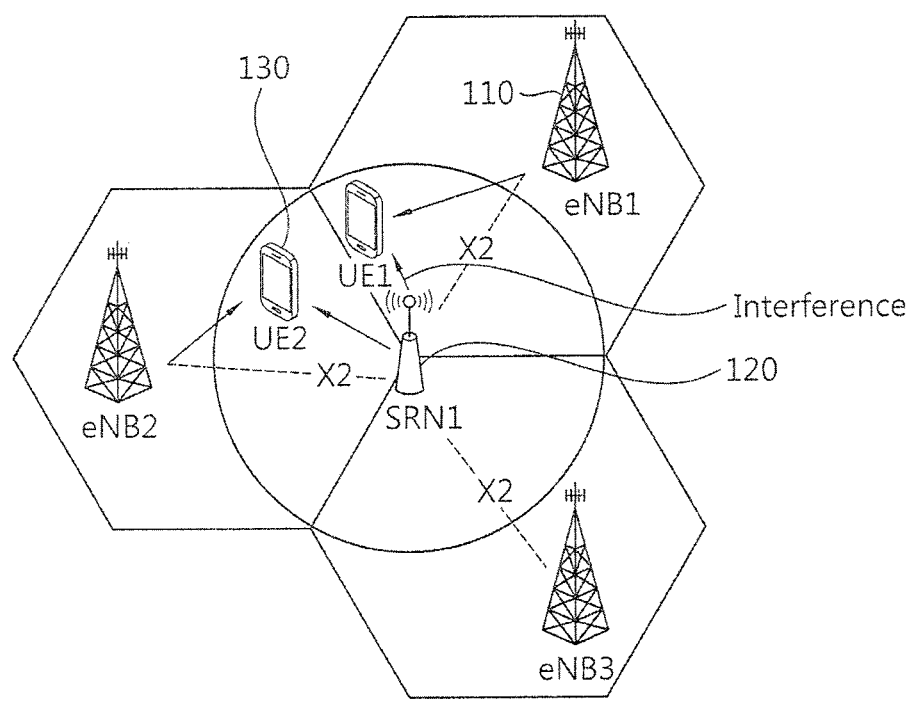

FIGS. 4a to 4c are diagrams illustrating a case where ICI occurs in a network structure based on the SRN.

FIG. 4a illustrates a case where the ICI occurs when three direct links eNB1-UE1, eNB2-UE2, an eNB3-UE3 between the eNB 110-UE 130 use the same resource.

FIG. 4b illustrates a case where the ICI occurs when direct links eNB1-UE1 and eNB2-UE2 between the eNB 110-UE 130 use the same resource.

FIG. 4c illustrates a case a signal of an access link of the SRN becomes an interference source of an UE1 to occur the ICI when an eNB1-UE1 direct link and an SRN-UE2 access link use the same resource while the SRN 120 retransmits a signal.

Figure 5:
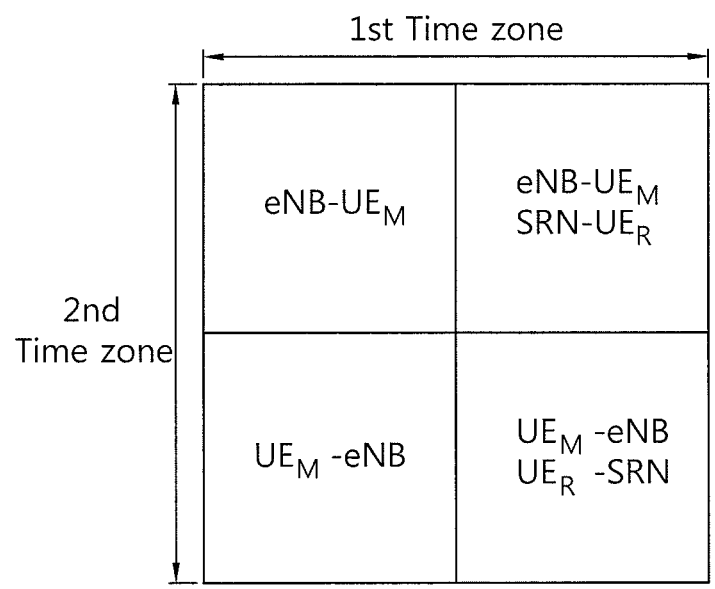
FIG. 5 illustrates a frame structure for applying a dynamic resource allocating (RA) method based on an SRN according to the embodiment of the present invention.

FIG. 5 illustrates a frame structure for applying a dynamic resource allocating (RA) method based on an SRN according to the embodiment of the present invention.

That is, FIG. 5 illustrates a frame structure in each time zone based on the SRN.

As shown in FIG. 5, in the downlink of a 1st time zone, an eNB transmits a data packet to an $UE_M$, and simultaneously, the SRN overhears a packet transmitted from the eNB.

In a 2nd time zone, the eNB transmits a data packet to an UEM, and the SRN performs relay transmission with respect to only UER in which an NACK occurs in the 1st Time Zone.

In this case, the SRN equally use a resource allocated to eNB-UEM. The dynamic RA based on the SRN is applied to the whole Resource Block (RB).

The eNB transmits a common RS to UEM for acquiring Channel Quality Indication (CQI) information of a corresponding band applied to each resource in order to implement scheduling of an eNB-UEM link. Further, the UEM calculates a CQI from the received common RS to transfer the CQI to the eNB while a corresponding uplink is open.

Meanwhile, in order for the SRN to exactly decode the signal, eNB-SRN, Source Nodes in eNB-SRN and $SRN-UE_R$ transmit dedicated Reference Signal (RS) to destination Nodes, and destination nodes in each link may calculate a CQI from the received dedicated RS and may transfer the calculated CQI to the source nodes when each uplink is open.

Figure 6A:
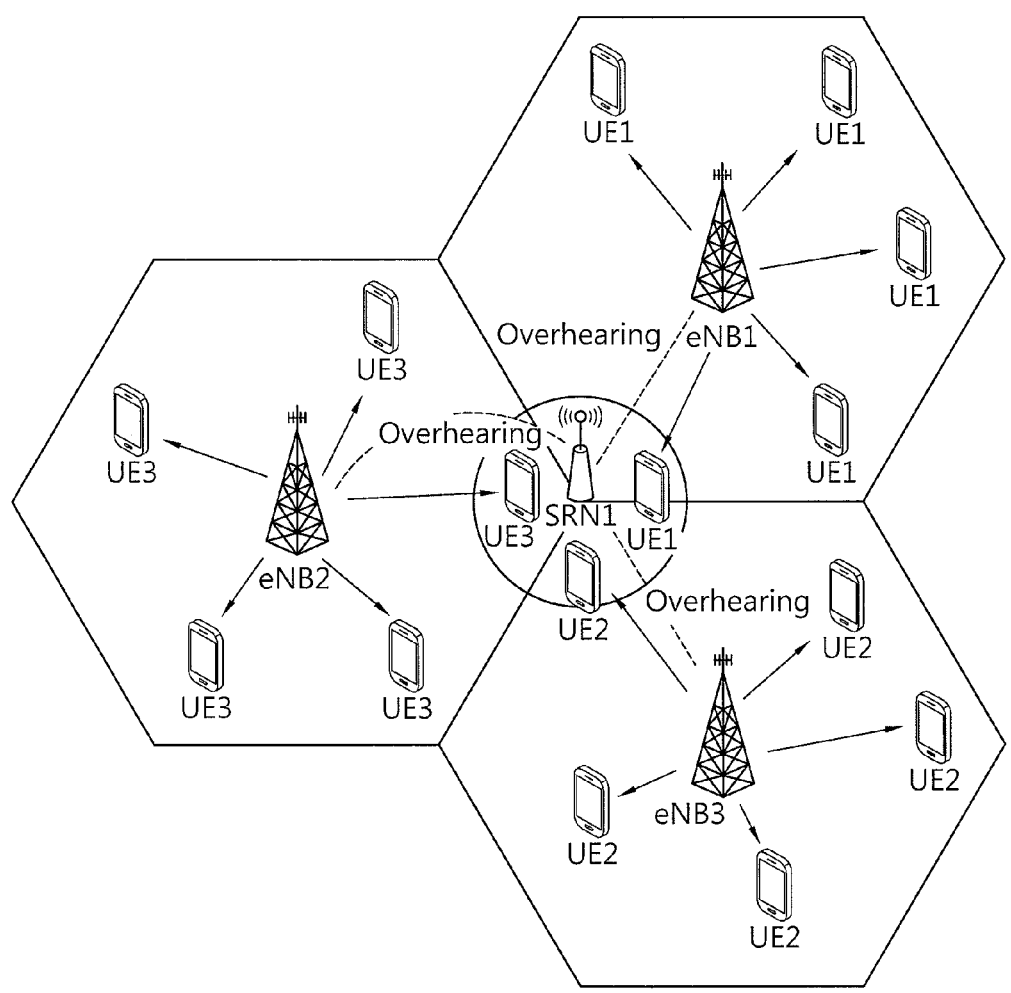
FIGS. 6a and 6b are diagrams illustrating a signal transmission operation in each time zone based on the SRN of FIG. 5.
Figure 6B:
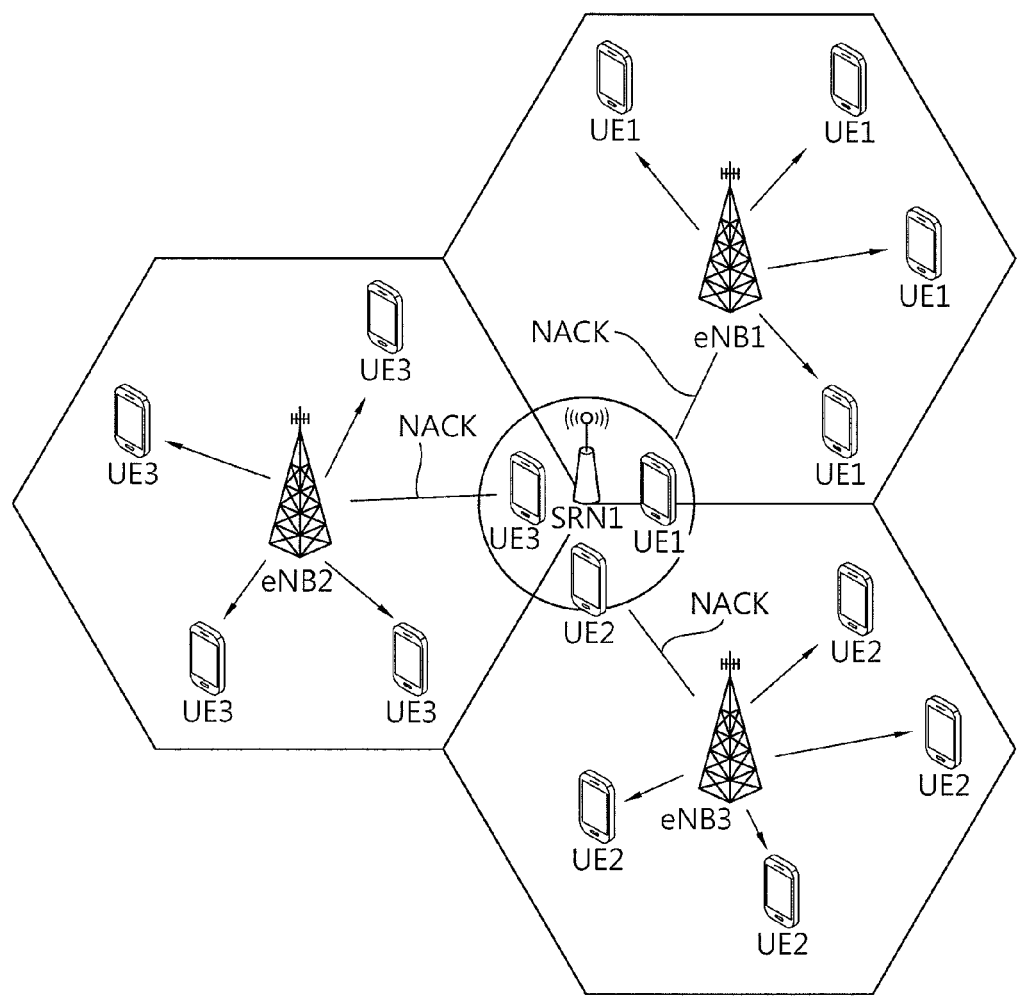

FIGS. 6a and 6b are diagrams illustrating a signal transmission operation in each time zone based on the SRN of FIG. 5.

As shown in FIG. 6a, a resource is allocated to $eNB-UE_M$ in the 1st time zone so that each eNB transmits a signal to UEs which are included in the eNB. Since the SRN is fixed and considers an excellent propagation path, the SRN perfectly overhears signal transmission from the eNB to the UEs.

Accordingly, since a signal may be transmitted to SRN-UE through overhear without link between eNB-SRN, the resource is not allocated for eNB-SRN.

As shown in FIG. 6a, signal transmission from the eNB to the UE in the 2nd time zone is still valid, but signal transmission of SRN→UE is valid only when NACK occurs in the signal transmission of eNB→UE.

Further, the SRN may operate to distinguish a cooperative mode from a non-cooperative mode.

It is assumed that eNB→UE uses the same resource in a cooperative mode, and a resource allocated to original eNB→UE is equally used in the non-cooperative mode. That is, a basic frame structure as illustrated in FIG. 5 may be considered.

Figure 7:
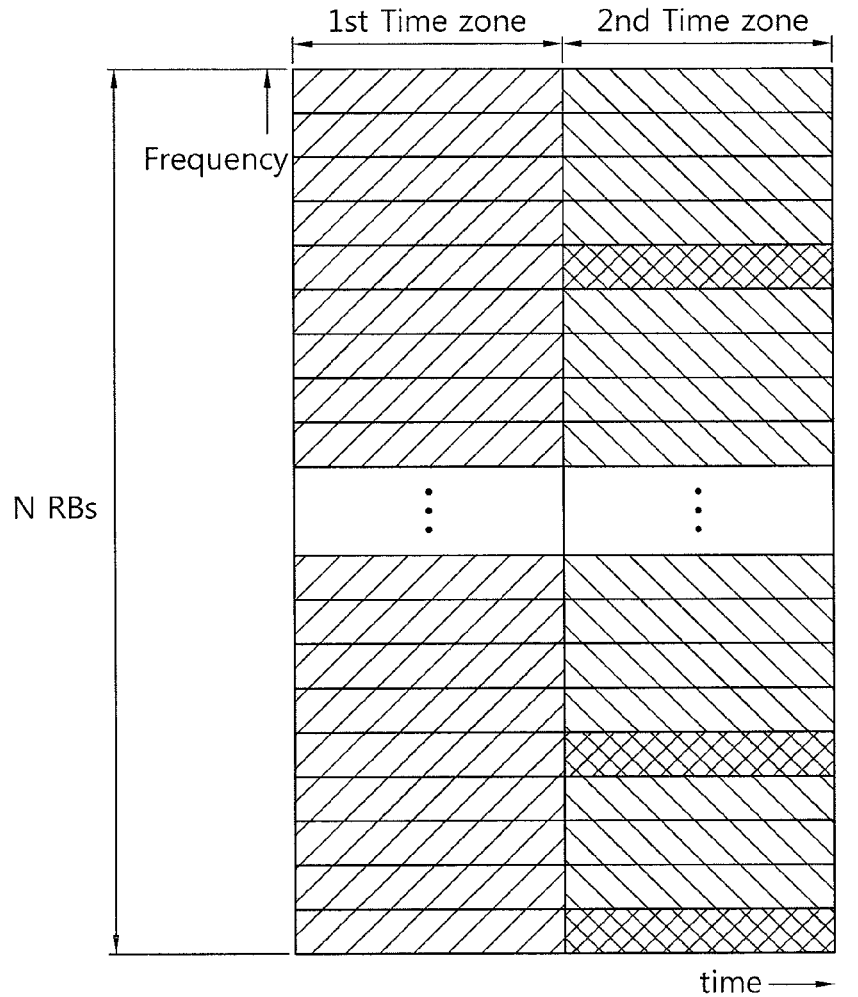
FIG. 7 is a diagram illustrating a dynamic RA method of each eNB in an SRN structure according to the embodiment of the present invention.

FIG. 7 is a diagram illustrating a dynamic RA method of each eNB in an SRN structure according to the embodiment of the present invention.

Each eNB considers a structure of dynamically allocating all RBs based on Full Frequency Reuse (FFR), and allocates RB to the UEs through various scheduling schemes (PF, Max CINR).

As shown in FIG. 7, a scheme where an RB does not overlap refers to a Non-overlap scheme or a Non-cooperative scheme. In the Non-overlap scheme, the SRN does not transmit a signal, but transmits the signal to only SRN-UE.

Further, Resource overlap or Cooperative scheme transmits the same signal to eNB-UE and SRN-UE using the same RB.

Figure 8A:
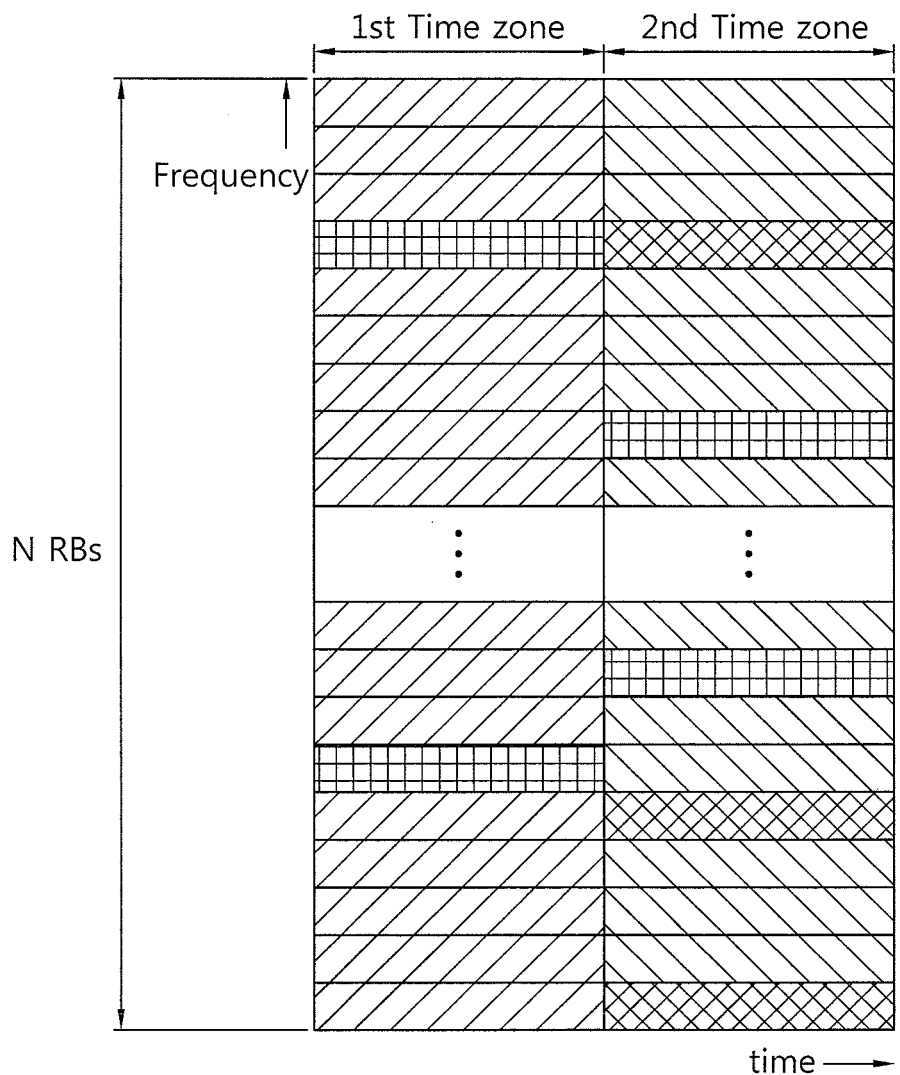
FIGS. 8a to 8c are diagrams a case where the same RB is allocated to UEs of a cell edge so that collision occurs when each eNB uses a Dynamic RA method.
Figure 8A:
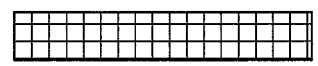
Figure 8B:
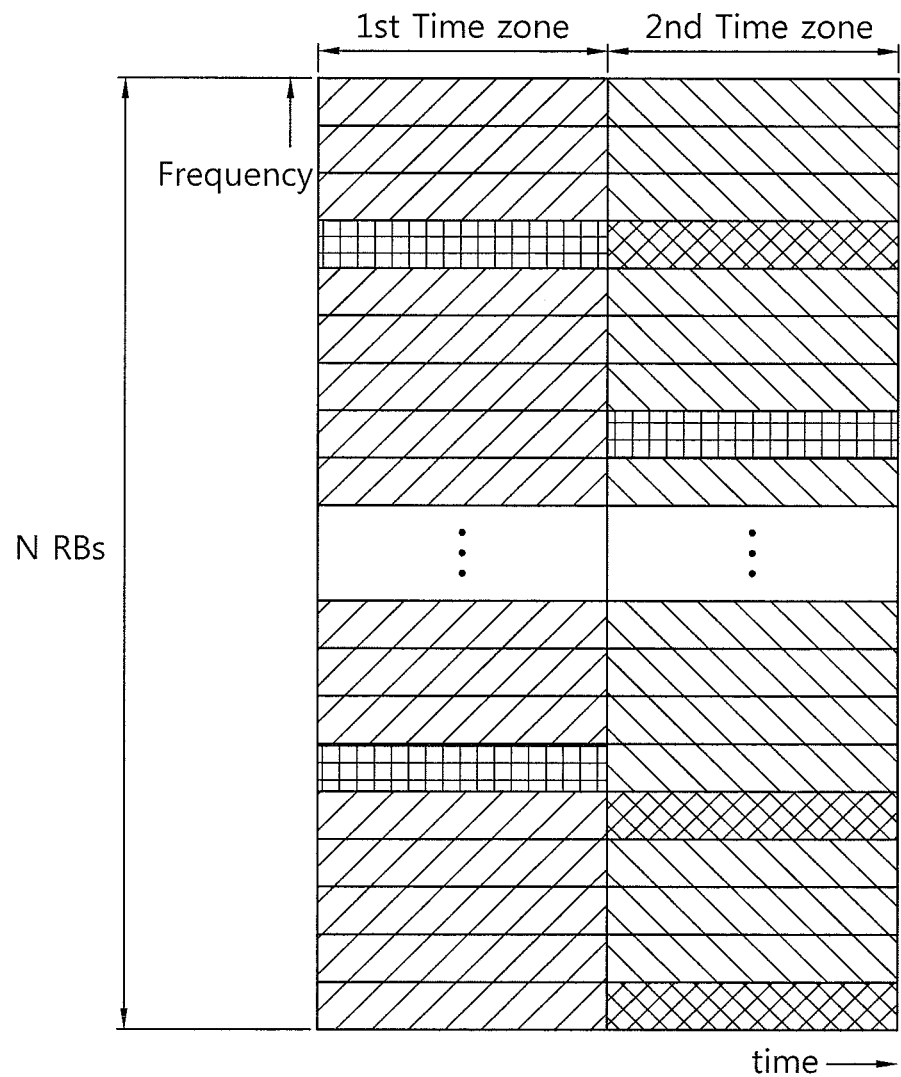
Figure 8B:
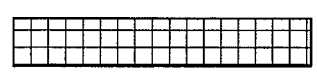
Figure 8C:
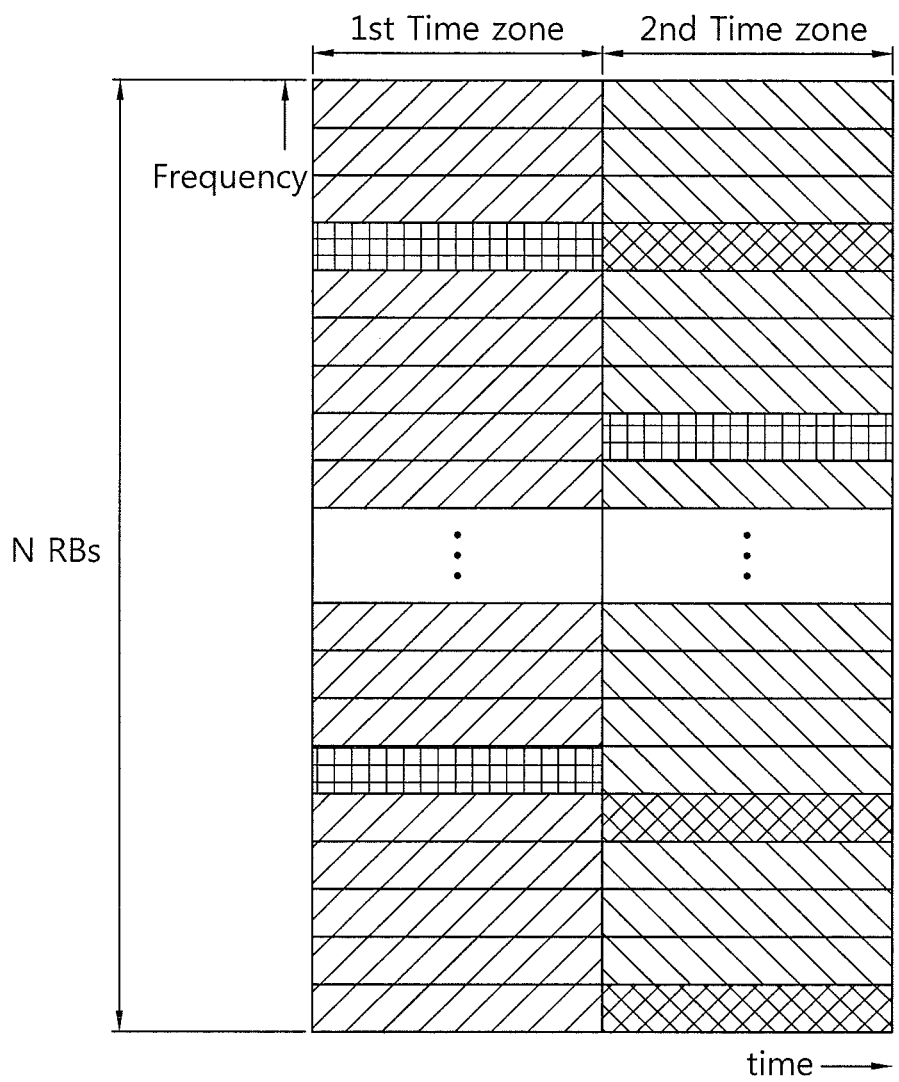
Figure 8C:
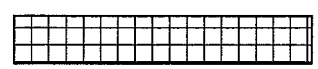

FIGS. 8a to 8c are diagrams a case where the same RB is allocated to UEs of a cell edge so that collision occurs when each eNB uses a Dynamic RA method.

As shown in FIGS. 8a to 8c, a hatched block 800 represents a block with which the resource collides. That is, when a multi-cell considers a dynamic RA scheme, UEs of the cell edge use the same RB to collide.

Hereinafter, a method of reallocating a resource based on an SRN for avoiding ICI in a dynamic resource allocating method based on a multi-cell FFR will be described.

As illustrated above, a method of reallocating a resource based on an SRN for avoiding ICI is provided by using the two basic advantages of the SRN.

First, the SRN is geographically located at a center of peripheral eNBs.

The zone in which the SRN is located is a cell boundary zone of eNBs, which is zone where collision of the RB frequently occurs and upon which ICI from peripheral eNBs greatly exert influence. Accordingly, the SRN has advantage beneficial to observe creation of the ICI in a center of a zone upon which ICI of a plurality of eNBs exerts influence.

Second, the SRN may overhear signals of all eNBs-UEs.

The SRN overhears signals of eNBs-UEs, and may exactly find a collision RB using downlink and uplink control signals among the overheard signals.

Method of Avoiding ICI Based on SRN

First Embodiment

The first embodiment provides a method of overhearing a control channel between eNB-UE to reallocate a direct resource block to a resource block in which collision occurs.

First, in order to perform a method of avoiding ICI according to the first embodiment, following parameters are defined.
1. $UE_b$ with respect to $UE_{a,b}$: $eNB_a$
2. $a \in \{1, \ldots, A\}$, the a and A represent an index and the total number of $eNB_s$, respectively 3. $b \in \{1, \ldots B\}$, the b and B represent an index and the total number of a UE with respect to each $eNB_a$, respectively Further, UEs of the SRN may be classified as follows.
1. $S_c \in \{UEa,b|UEb$ with respect to $eNBa$ within a coverage area of the SRN$\}$
2. $c \in \{1, \ldots, C\}$, the c and C represent an index and the total number of UE within a coverage area of the SRN
3. $S_d = (S_c)^c \in \{UEa,b|UEb$ with respect to $eNBa$ outside the coverage area of the SRN$\}$
4. $d \in \{1, \ldots, D\}$, the d and D represent an index and the total number of UE outside the coverage area of the SRN In addition, the index of the RB may be expressed as follows.
1. RB(k): index k-th RB
2. $k \in \{1, \ldots, K\}$, the k and K represent an index and the total number of RB, respectively
3. $RB_{S_c}(l)$: index l-th RB with respect to UE of Sc
4. $l \in \{1, \ldots, L\}$, the l and L represent an index and the total number of RB with respect to UE of Sc, respectively
5. $RB_{S_d}(m)$: index m-th RB with respect to UE of Sd
6. $m \in \{1, \ldots, M\}$, the m and M represent an index and the total number of RB with respect to UE of Sd, respectively Further, SINR with respect to each RB may be expressed as follows.

$SINR_{RB(k)}$, $SINR_{RB(l)}$, and $SINR_{RB(m)}$ refer to SINRs with respect to k-th, l-th, and m-th RBs, respectively.

The SRN finds a collision RB in a block of the SRN using parameters, and reallocates a resource with respect to the collision RB. That is, a method of reallocating a resource for avoiding collision according to the present invention may include 1) a procedure of fining a collision RB, and 2) a procedure of reallocating a resource for avoiding a collision RB.

Hereinafter, 1) a procedure of fining a collision RB, and 2) a procedure of reallocating a resource for avowing a collision RB will be described in detail.

Procedure of finding a collision RB

Figure 9A:
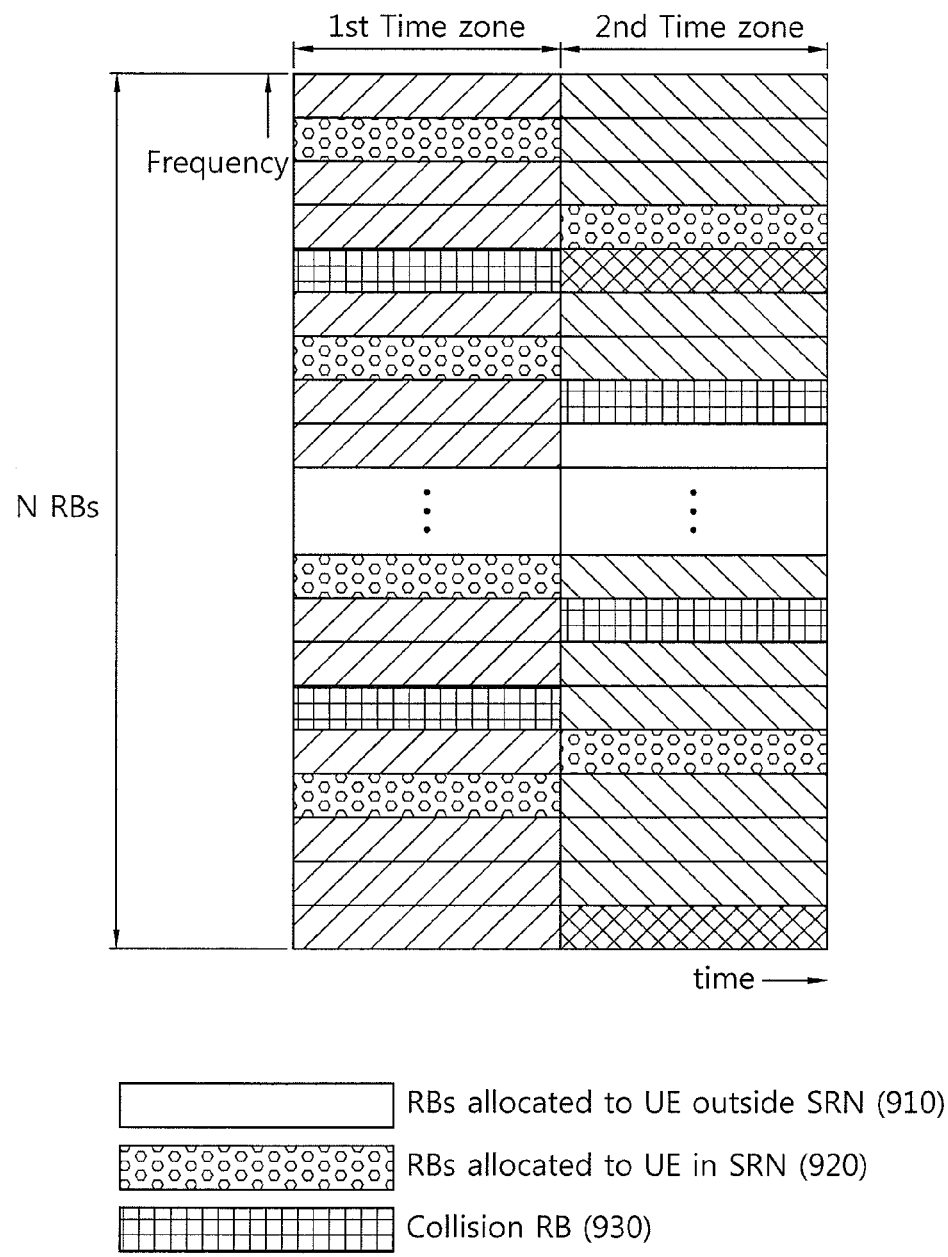
FIGS. 9a to 9c are diagrams illustrating classification of an RB in a cell structure based on an SRN according to the first embodiment of the present invention.
Figure 9B:
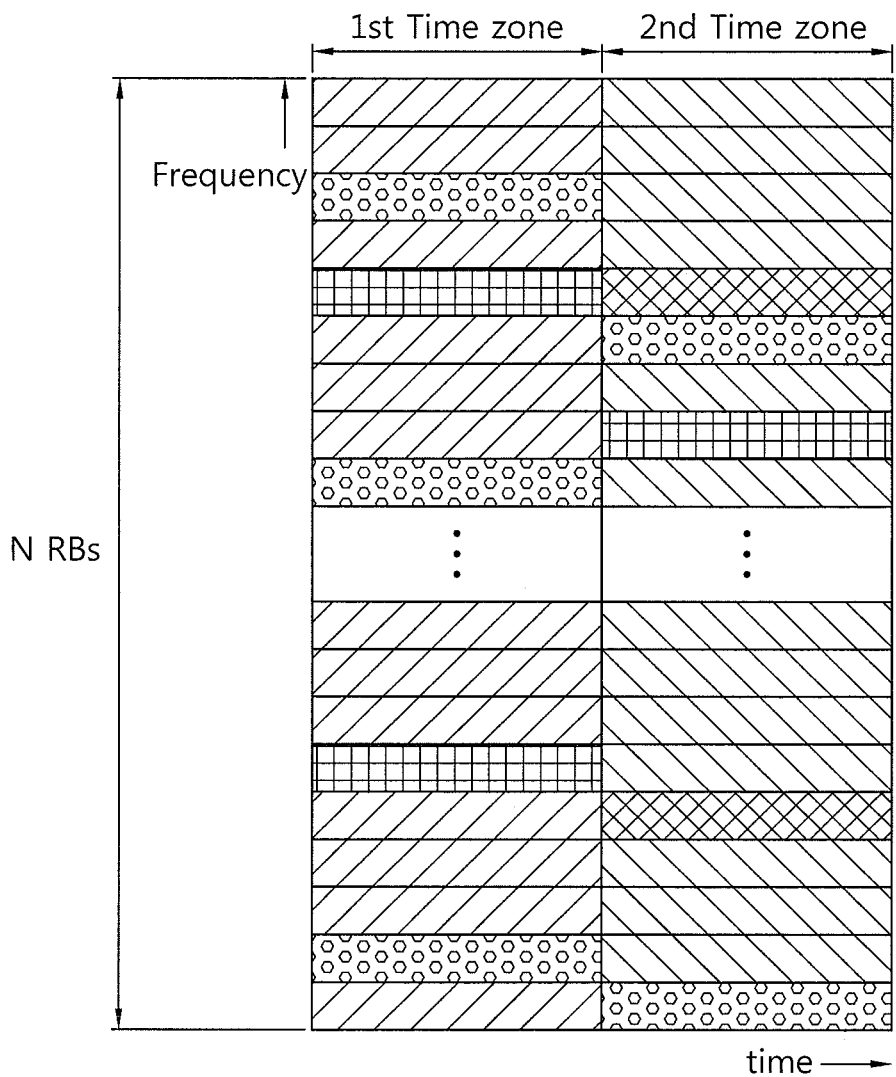
Figure 9C:
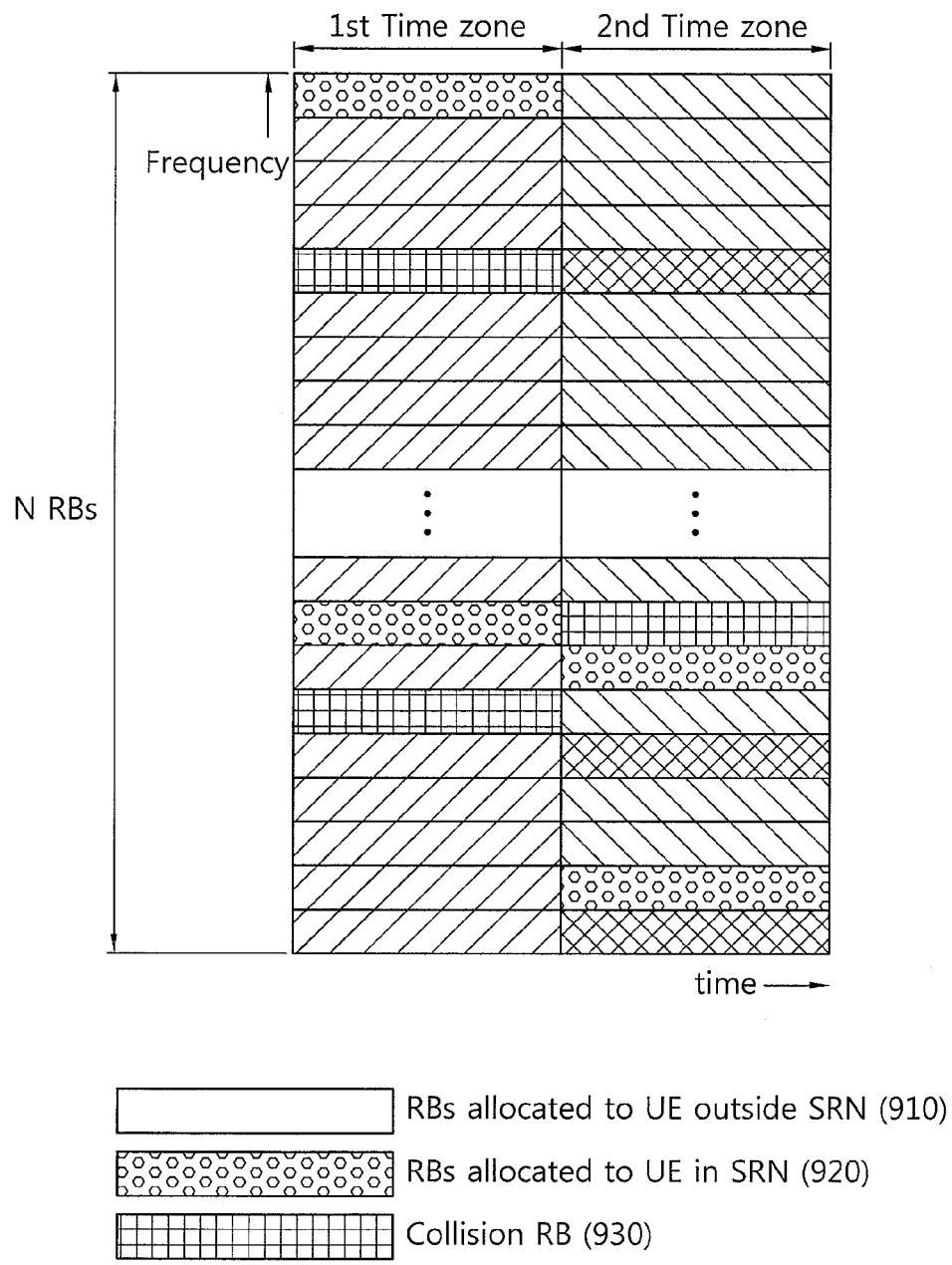

FIGS. 9a to 9c are diagrams illustrating classification of an RB in a cell structure based on an SRN according to the first embodiment of the present invention.

The SRN finds an RN in which collision occur by comparing RBs of UEs within $S_c$ of the SRN, that is, a coverage area of the SRN. As shown in FIGS. 9a to 9c, the RB is classified into RBs 920 with respect to an UE within a block of the SRN and RBs 910 with respect to an UE outside the block of the SRN. When the RBs of the UE within the block of the SRN are the same as each other, the RB is classified as a collision RB 930.

The procedure of finding a collision RB depends on following procedures.
① Set $RB_{S_j}(l)$, $RB_{S_d}(m)$ at each $eNB_a$
② Mapping $RB^a_{S_c}(l)$ into $RB^a_{S_c}(k)$ at each $eNB_a$
For i=1:(A-1)
③ Find $RB^i_{S_c}(k) = RB^a_{S_c}(k)$
④ Store collision_ki(q)∈$\{\forall k | RB^i_{S_c}(k) = RB^a_{S_c}(k)\}$
End In this case, $q \in \{1, \ldots, Q\}$, and the q and Q represent an index and the total number of the collision RB, respectively.

α satisfies $\alpha \in \{\forall a | $except current i$\}$, and refers to all a except for a current i.

The above procedures ① to ④ will be sequentially described. $RB_{S_j}(l)$, and $RB_{S_d}(m)$ are set to each $eNB_a$ in the procedure ①.

An RB Index with respect to each $eNB_a$ is mapped from 1 to k in the procedure ②.

All indexes where a UE of the SRN with respect to each $eNB_a$ use the same RB are found in the procedure ③.

An index k in which a collision RB occurs with respect to each $eNB_a$ is designated as a variable of a collision_ki(q) and is stored as a vector column in the above procedure ④.

Procedure of reallocating a resource for avoiding a collision RB

The procedure of reallocating a resource for avoiding a collision RB as the second step will be described.

That is, the second step provides a method of blocking generation of the ICI between eNBs in a cell boundary zone using a collision RB index obtained in the first step. Particularly, the second step mainly provides a method of exchanging RBs in which collision occur with RBs outside the block of the SRN.

The second step depends on following procedures.

For a=1:A
For q=1:Q
For m=1:M
① Mapping $RB^a_{S_d}(m)$ into $RB^a_{S_d}(k)$ at each $eNB_a$
② $k'=Argmin|SINR_{collision\ k^a(q)}-SINR_{RB^a_{S_d}}(k)|$
③ Change collision_k-th RB into k'-th RB
④ Update $RB^a_{S_d}(m) \in \{RB^a_{S_d}(m) | $ except a mapped current $RB^a_{S_d}(k')$ to avoid RB collision$\}$
End
End
End The first step obtains a collision_ki(q) with respect to each $eNB_a$.

Using the result of the first step, the second step presents a method of removing a collision RB with respect to each $eNB_a$.

The second will be sequentially described. First, $RB^a_{S_d}(m)$ with respect to $eNB_a$ is mapped to $RB^a_{S_d}(k)$ as an index in ①.

A factor k satisfying a following equation $|SINR_{collision\ k^a(q)}-SINR_{RB^a_{S_d}}(k)|$ is defined as k'. Meaning of the equation is associated with a type of the SRN.

Since the SRN retransmits the signal after recognizing NACK, the SRN does not need to find higher SINR in an RB of Sd. That is, the equation is progressed in consideration of a fact where a signal of the same MCS level is retransmitted.

A ④ is a procedure of updating an RB in which an RA is changed by an SRN. Particularly, it is considered that an RB set of $S_d$ is a zone having no ICI other than a block of $S_c$.

Hereinafter, a method of reallocating a resource by an SRN according to the first embodiment will be described by way of example.

First, parameters are set as follows.
A=3($UE_{1,b}$, $UE_{2,b}$, $UE_{3,b}$),
B=20($UE_{1,1-20}$, $UE_{1,1-20}$, $UE_{1,1-20}$),
C=10($UE_{1,2}$, $UE_{1,8}$, $UE_{1,11}$, $UE_{1,17}$, $UE_{2,9}$, $UE_{2,13}$, $UE_{2,14}$, $UE_{3,1}$, $UE_{3,6}$, $UE_{3,9}$)
D=50(Except following these C=10)
K=50(RB total index),
$L^{(1)}=7$, $L^{(2)}=11$, $L^{(3)}=5$, $M^{(1)}=43$, $M^{(2)}=39$, $M^{(3)}=45$ FIG. 10 is a diagram illustrating an actual case of a collision RB in a cell structure based on an SRN according to the first embodiment of the present invention.

Figure 10:
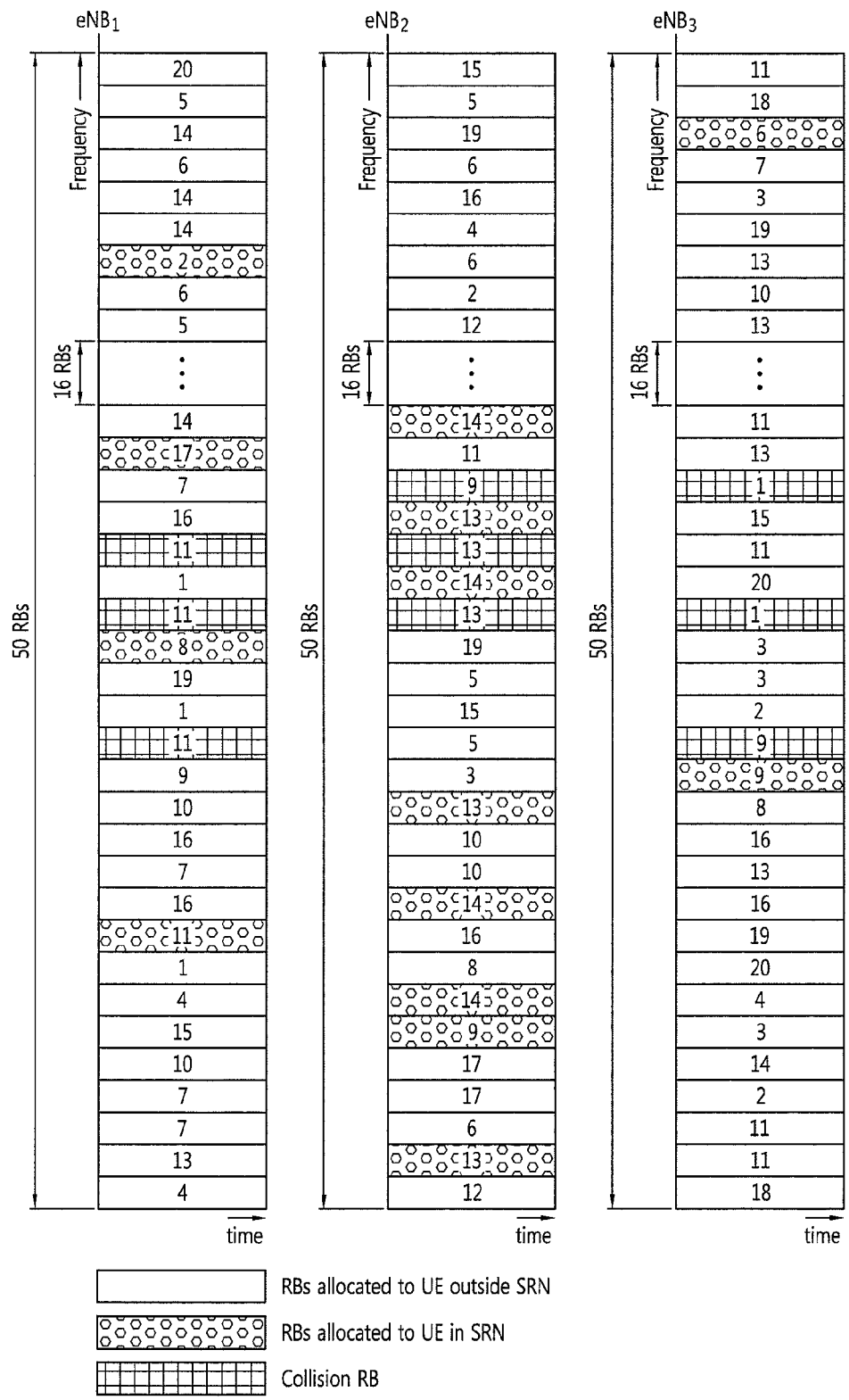
FIG. 10 is a diagram illustrating an actual case of a collision RB in a cell structure based on an SRN according to the first embodiment of the present invention.

As illustrated in FIG. 10, assuming that RB collision occurs, a first step fining the collision RB may be expressed as follows.

(1) Set $RB_{S_d}(1)$, $RB_{S_d}(m)$ at each $eNB_a$:
$RB^1_{S_c}(1)$, $RB^1_{S_c}(2)$, $RB^1_{S_c}(3)$, $RB^1_{S_c}(4)$, $RB^2_{S_c}(1)$, $RB^2_{S_c}(2)$, $RB^2_{S_c}(3)$, $RB^3_{S_c}(1)$, $RB^3_{S_c}(2)$, $RB^3_{S_c}(3)$, (2) Mapping $RB^a_{S_c}(l)$ into $RB^a_{S_c}(k)$ at each $eNB_a$
For i=1:(A-1):
$RB^1_{S_c}(1) \rightarrow RB^1_{S_c}(7)$, $RB^1_{S_c}(2) \rightarrow RB^1_{S_c}(27)$, $RB^1_{S_c}(3) \rightarrow RB^1_{S_c}(30)$, $RB^1_{S_c}(4) \rightarrow RB^1_{S_c}(32)$, $RB^1_{S_c}(5) \rightarrow RB^1_{S_c}(33)$, $RB^1_{S_c}(6) \rightarrow RB^1_{S_c}(36)$, $RB^1_{S_c}(7) \rightarrow RB^1_{S_c}(42)$:
$RB^2_{S_c}(1) \rightarrow RB^2_{S_c}(26)$, $RB^1_{S_c}(2) \rightarrow RB^1_{S_c}(28)$, $RB^2_{S_c}(3) \rightarrow RB^2_{S_c}(29)$, $RB^2_{S_c}(4) \rightarrow RB^1_{S_c}(30)$, $RB^2_{S_c}(5) \rightarrow RB^2_{S_c}(31)$, $RB^2_{S_c}(6) \rightarrow RB^2_{S_c}(32)$, $RB^2_{S_c}(7) \rightarrow RB^2_{S_c}(38)$, $RB^2_{S_c}(8) \rightarrow RB^2_{S_c}(41)$, $RB^2_{S_c}(9) \rightarrow RB^2_{S_c}(44)$, $RB^2_{S_c}(10) \rightarrow RB^2_{S_c}(45)$, $RB^2_{S_c}(11) \rightarrow RB^2_{S_c}(49)$:
$RB^3_{S_c}(1) \rightarrow RB^3_{S_c}(3)$, $RB^3_{S_c}(2) \rightarrow RB^3_{S_c}(28)$, $RB^3_{S_c}(3) \rightarrow RB^3_{S_c}(32)$, $RB^3_{S_c}(4) \rightarrow RB^3_{S_c}(36)$, $RB^3_{S_c}(5) \rightarrow RB^3_{S_c}(37)$
For i=1:(A-1)
(3) Find $RB^i_{S_c}(k) == RB^\alpha_{S_c}(k)$
(4) Store collision_ki(q)$\in \{\forall k | RB^i_{S_c}(k) == RB^\alpha_{S_c}(k)\}$:
$RB^1_{S_c}(30)$, $RB^1_{S_c}(32)$, $RB^1_{S_c}(36)$:
$RB^2_{S_c}(28)$, $RB^2_{S_c}(30)$, $RB^2_{S_c}(32)$:
$RB^3_{S_c}(28)$, $RB^3_{S_c}(32)$, $RB^3_{S_c}(36)$
End The following is a procedure of reallocating an RB through collision RB avoidance in a second step based on finding the collision RB in the first step.

For a=1:A
For q=1:Q
For m=1:M
(1) Mapping $RB^a_{S_d}(m)$ into $RB^a_{S_d}(k)$ at each $eNB_a$
(2) $|k'=Argmin|SINR_{collision\ k^a(q)}-SINR_{RB^a_{S_d}}(k)|$:
Collision_k1(1)=30, Collision_k1(2)=32, Collision_k1(3)=36:
Collision_k2(1)=28, Collision_k2(2)=30, Collision_k2(3)=32:
Collision_k3(1)=28, Collision_k3(2)=32, Collision_k3(3)=36:
$RB^1_{S_d}(k)$ includes all RBs except for 7-th, 27-th, 30-th, 32-th, 33-th, 36-th, and 42-th RBs:
$RB^2_{S_d}(k)$ includes all RBs except for 26-th, 28-th, 29-th, 30-th, 31-th, 32-th, 38-th, 41-th, 44-th, 45-th, and 49-th RBs:
$RB^3_{S_d}(k)$ includes all RBs except for 3-th, 28-th, 32-th, 36-th, and 37-th RBs
(3) Change collision_k-th RB into k'-th RB
(4) Update $RB^a_{S_d}(m) \in \{RB^a_{S_d}(m) | $ except a mapped current $RB^a_{S_d}(k')$ to avoid RB collision$\}$
End
End
End FIG. 11 is a diagram illustrating a procedure of reallocating a resource for avoiding a collision RB in a cell structure based on an SRN according to the first embodiment of the present invention.

Figure 11:
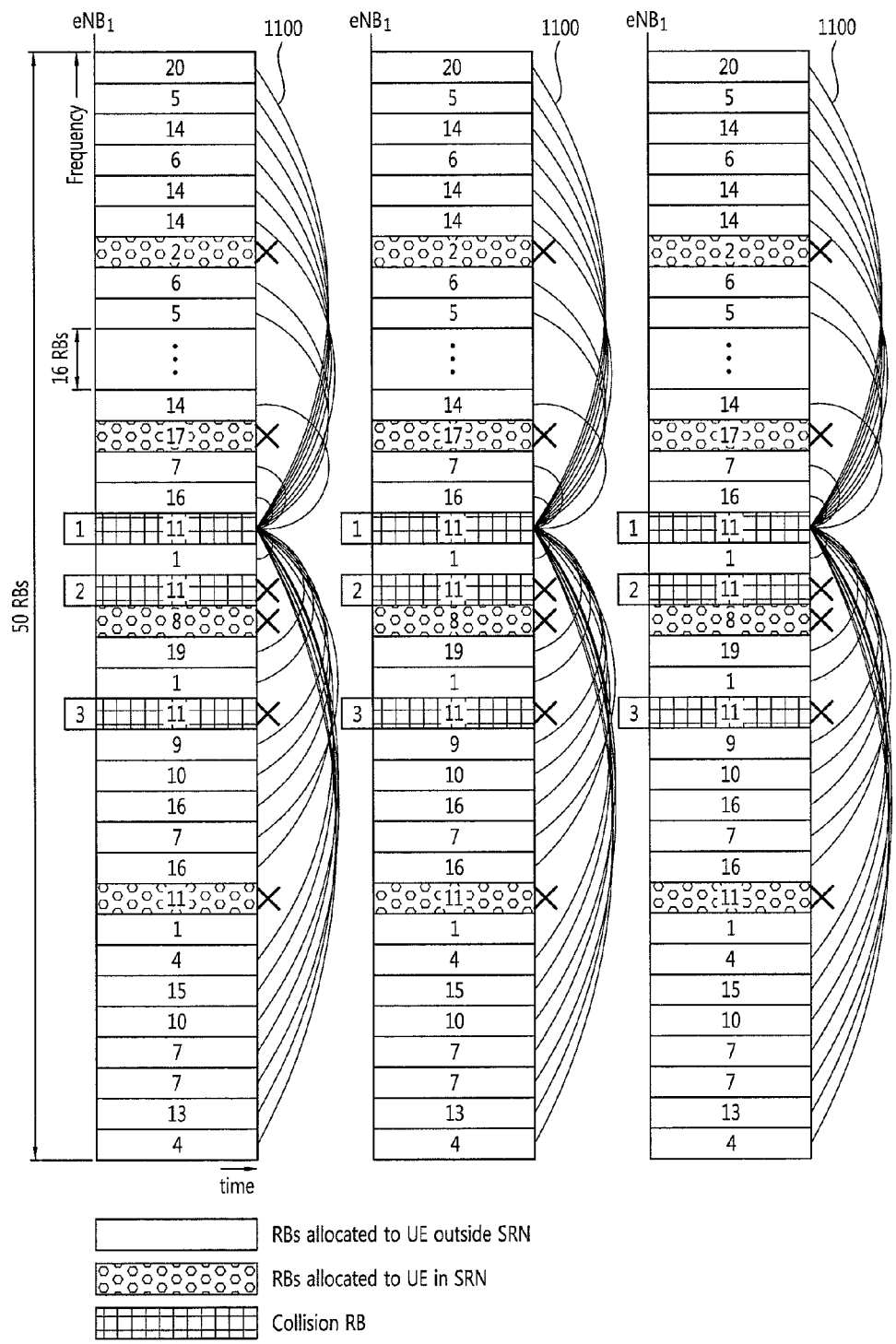
FIG. 11 is a diagram illustrating a procedure of reallocating a resource for avoiding a collision RB in a cell structure based on an SRN according to the first embodiment of the present invention.

As shown in FIG. 11, the second step compares an SINR of an RB of a UE which is not located in a zone of the SRN with SINRs of collision RBs with respect to respective eNBs, and selects an RB having the smallest SINR to exchange RBs for each other. A black solid line 1100.

Second Embodiment

The second embodiment provides a method of reallocating a collision resource by transferring information to preventing collision of a resource block allocated to an UE to an eNB by an SRN.

When a resource with respect to UEs within a coverage area of an SRN collides, the SRN transfers information for preventing collision of the resource so that the source may be prevented from colliding when eNBs reallocate a resource to UEs.

Information transferred to eNBs by the SRN is illustrated in following 1 and 2.

1. IDs of UEs within a block of the SRN:

As illustrated above, the SRN may grasp UEs within a coverage area of the SRN. Accordingly, the SRN grasps UEs in the SRN, and transfers IDs of corresponding UEs to eNBs.

2. IDs of UEs in which resource collision occur:

The SRN transfers IDs of UEs in which NACK (that is, resource collision) occurs while overhearing downlink and uplink signals transceived between eNB-UE.

Accordingly, respective eNBs having received the two types of information from the SRN prevent resource collision with respect to UEs by exchanging an RB of UEs in which NACK occurs.

The RB to be exchanged includes an RB except for the RB of UEs within a block of the SRN.

Third Embodiment

The third embodiment provides a method of simultaneously reallocating a resource by an SRN and eNBs when resource collision occurs.

That is, the third embodiment provides a method of partially processing resource allocation avoidance information to prevent ICI and transferring processed information to respective eNBs by an SRN so that eNBs reallocate a resource. A detailed method of reallocating a resource according to the third embodiment may be performed as follows.

First, (1) the whole UEs in the SRN are classified by eNBs.

(2) The SRN calculates the number of UEs in the SRN with respect to UEs served by respective eNBs with a predetermined ratio.

(3) The SRN applies the ratio information calculated in (2) as an RB ratio to transfer RBs block of SRN UEs to respective eNBs.

The third embodiment may be performed when resource collision occurs, and is applied to a method of allocating a resource so that each eNB does not resource collision without an HARQ timing procedure, thereby prevent basic resource allocation from colliding.

That is, through following methods, each eNB allocates a resource to an UE to prevent resource allocation from colliding.

(1) Each eNB receives a cell ID corresponding to each UE in the SRN from the SRN, and allocates a resource to UEs using the received cell ID.

First, the SRN overhears an uplink SRB signal of the SRN, and discriminates UEs in the SRN. Next, the SRN grasps a cell ID with respect to each UE in the SRN, and reports to corresponding cells that respective UEs are UEs in the SRN (it is assumed that a resource is statically divided by cells).

(2) The SRN classifies UEs in the SRN based on each cell ID, and classifies UEs in the SRN by corresponding cells to grasp the number of UEs, proportionally applies the UEs to the whole resource block to report a corresponding resource ratio by cells. Accordingly, each eNB allocates a resource to UEs (method of dynamically classifying the resource according to the number of UEs in the SRN).

Figure 12:
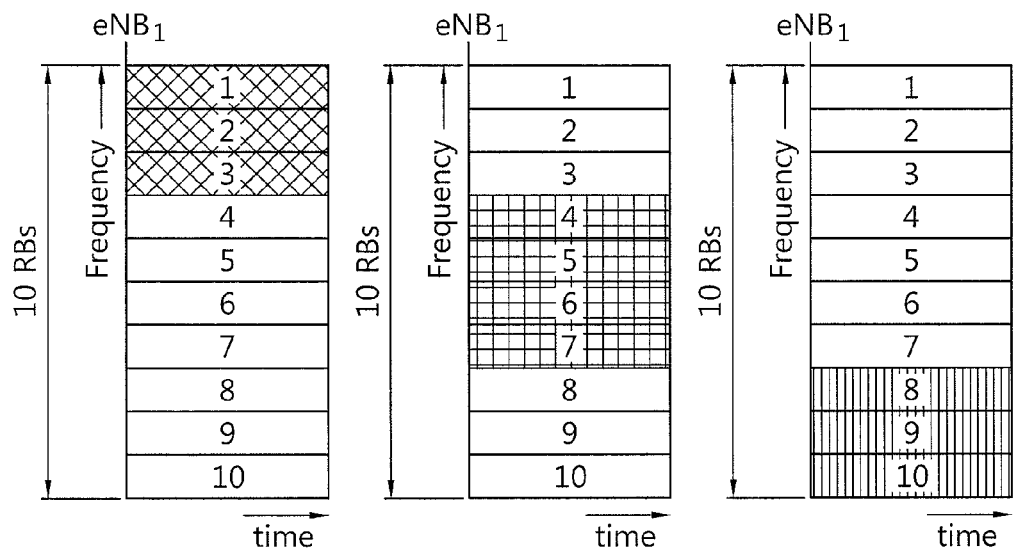
FIG. 12 is a diagram illustrating a method of reallocating a resource for avoiding ICI according to the third embodiment of the present invention.

FIG. 12 is a diagram illustrating a method of reallocating a resource for avoiding ICI according to the third embodiment of the present invention.

When the ratio served by respective eNBs is eNB1:eNB2: eNB3=3:4:3, as shown in FIG. 12, RBs for UEs in a block of the SRN are allocated (1210, 1220, and 1230).

That is, as shown in FIG. 12, the SRN transfers an allocated RB for UEs to respective eNBs, and respective eNBs preferentially allocate SRN UEs in a corresponding shadow zone, and dynamically allocated other UEs with respect to a remaining RB.

Hereinafter, a method of performing a HARQ timing process by the SRN based on a function of the SRN and a method of avoiding ICI (first to third embodiment) will be described in detail.

1. The SRN may apply a method of avoiding ICI in a HARQ timing procedure as follows.

(1) Centralized scheme:

is a scheme of performing a method of avoiding ICI alone by an SRN.

(2) Distributed scheme:

is a scheme of performing a method of avoiding ICI by the SRN and the eNB.

(3) Target is UEs transmitting ACK or NACK (4) Target is only an UE transmitting NACK Cases of the (1) and (2) classify UEs in view of a subject performing an algorithm for avoiding ICI. Cases of the (3) and (4) classify UEs in view of UEs which is an algorithm object for avoiding the ICI.

The case of (2) may include 1) a case of performing a method of avoiding ICI by the SRN and the eNB and 2) a case of performing a method of transmitting information necessary to perform the method of avoiding ICI by the SRN and performing the method of avoiding the ICI by the eNB.

2. The SRN may perform an HARQ timing procedure as follows.

(1) Cooperative mode:

is a scheme of retransmitting a downlink signal together with an eNB.

(2) Non-cooperative mode:

is a scheme of transmitting a downlink signal by only an SRN.

3. The SRN may perform an HARQ timing procedure as follows.

(1) Frequency division duplex (FDD) mode

1) Full-duplex scheme

2) Half-duplex scheme (2) Time division duplex (TDD) mode

Hereinafter, through the cases 1 to 3, a case of performing the HARQ timing procedure by applying the method of avoiding the ICI by the SRN will be described in detail.

Since the SRN shares a plurality of (e.g., 3) eNBs, in drawings illustrating the HARG timing procedure, ACK or NACK transceived between each eNB and the UE is separately indicated.

Figure 13A:
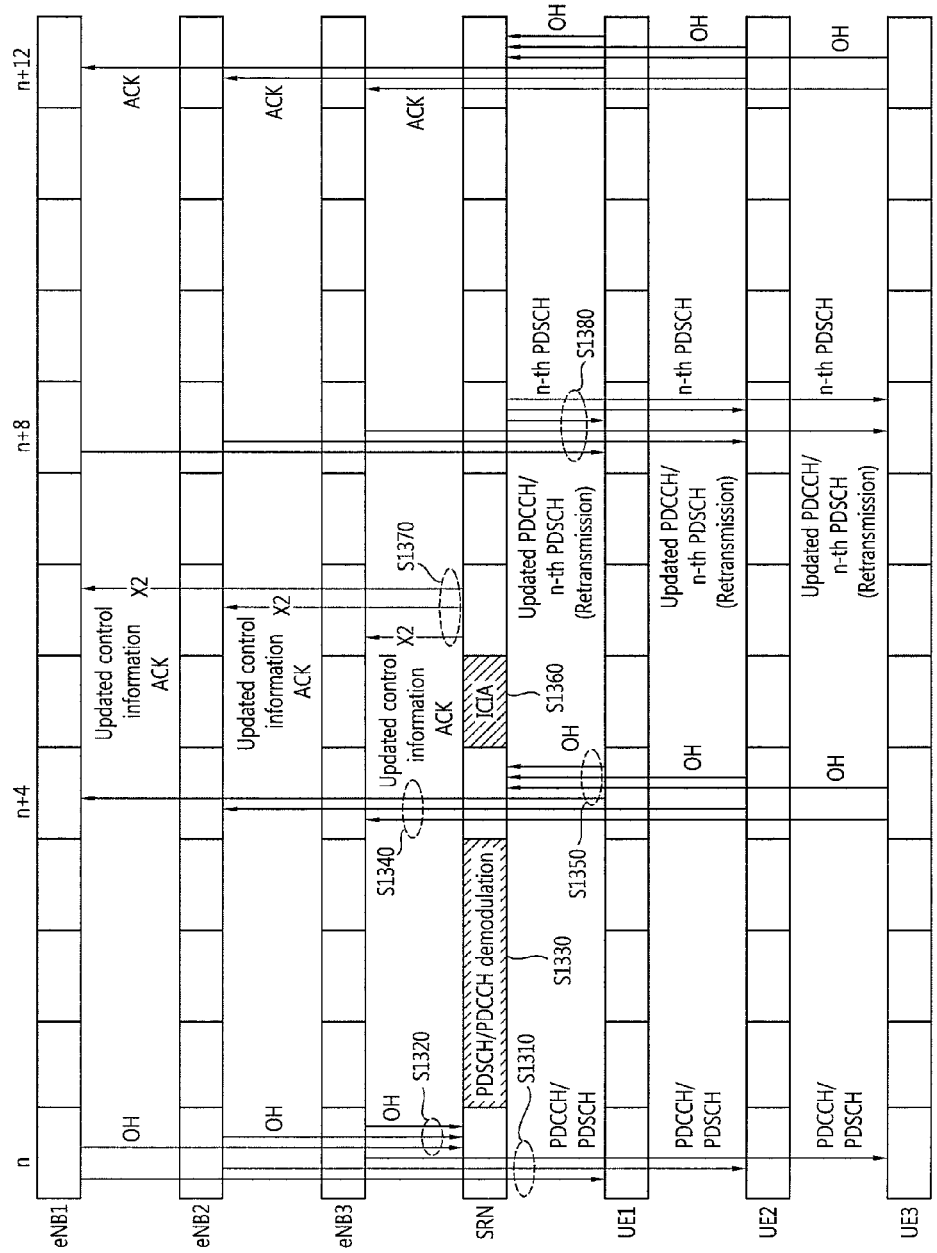
FIGS. 13a to 13c are diagrams illustrating an HARQ timing procedure of an SRN according to the embodiment of the present invention.
Figure 13B:
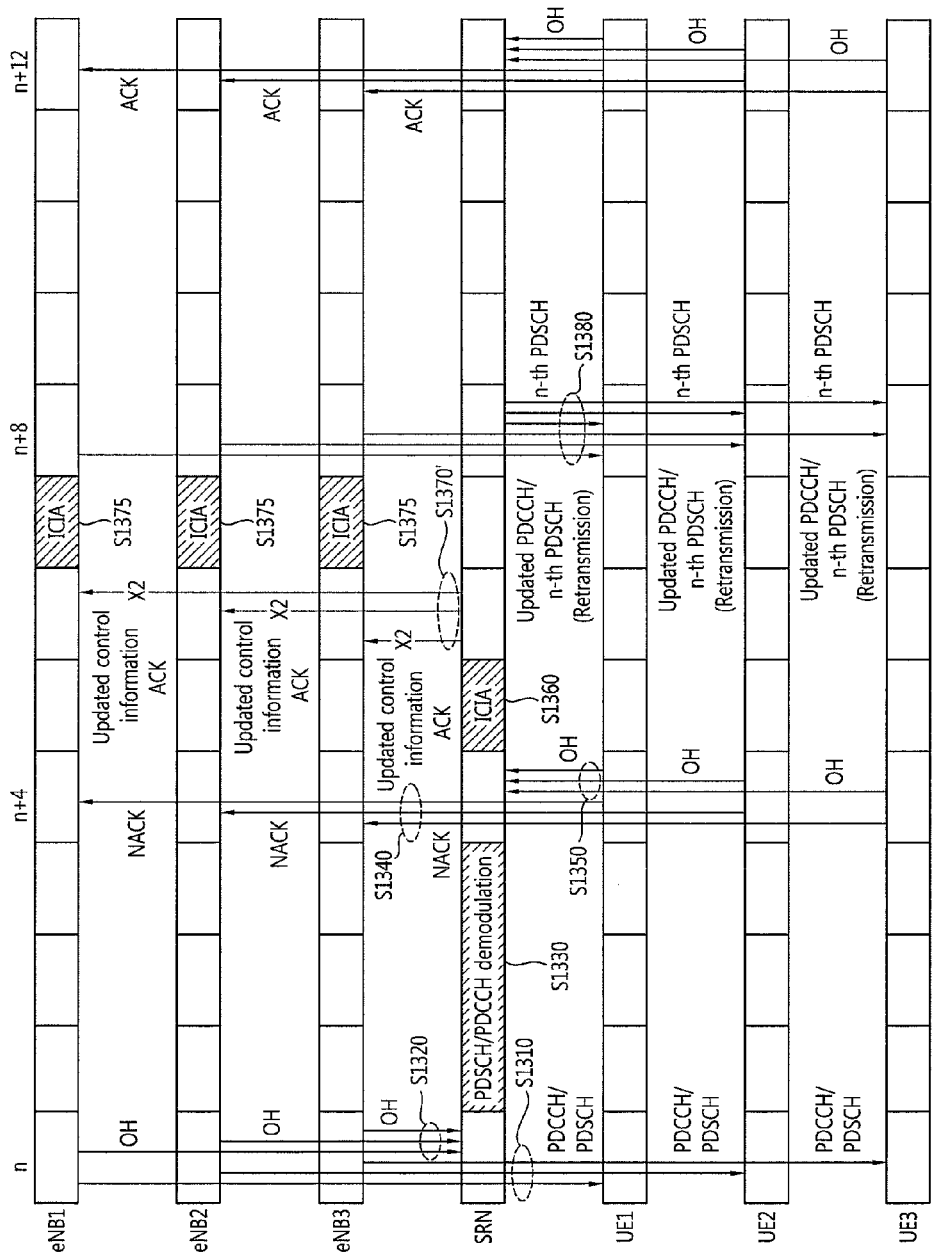
Figure 13C:
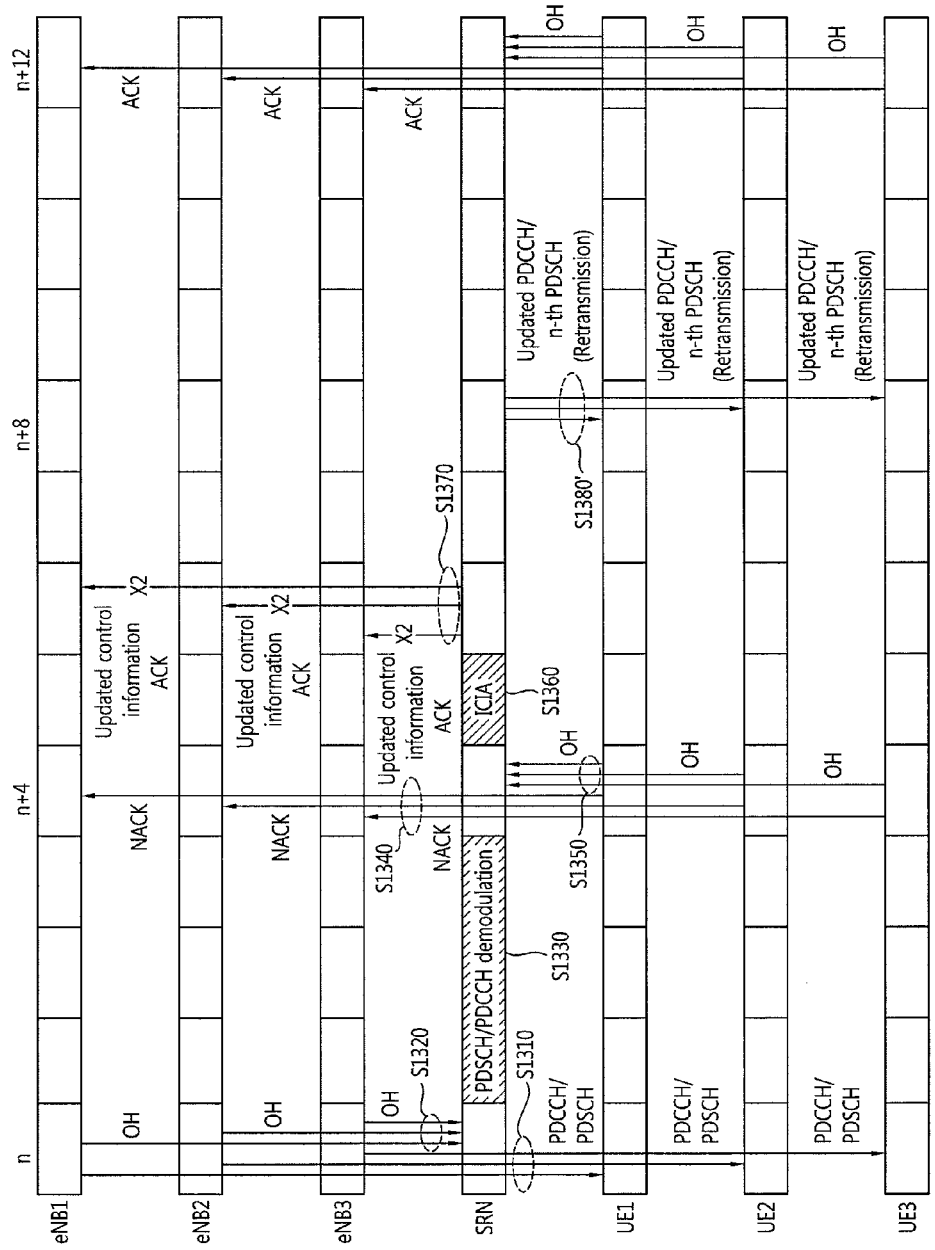

FIGS. 13a to 13c are diagrams illustrating an HARQ timing procedure of an SRN according to the embodiment of the present invention.

FIGS. 13a to 13c illustrate a method of cooperatively transmitting a signal with an eNB by performing a procedure of avoiding the ICI by the SRN when all UEs with respect to each eNB in a cell boundary zone generate the ICI, that is, when the ICI is generated as eNB1-UE1, eNB2-UE2, and eNB3-UE3 use the same resource.

First, FIG. 13a illustrate an HARQ timing procedure which performs a procedure of avoiding the ICI by only the SRN and cooperatively retransmits a downlink signal with an eNB.

Referring to FIG. 13a, respective eNB1, eNB2, and eNB3 transmit a PDCCH and a PDSCH to UEs within a coverage area of each eNB in an $n^{th}$ sub-frame (S1310). That is, the eNB1, the eNB2, and the eNB3 transmit a downlink signal to an UE1, an UE2, and an UE3, respectively. The eNBs constitute one cluster. The downlink signal may include a PDCCH and a PDSCH. For example, hereinafter, the PDCCH and the PDSCH are described.

The SRN overhears the PDCCH and the PDSCH transmitted by respective eNBs to UEs in an $n^{th}$ sub-frame (S1320).

Next, the SRN decodes the overheard PDCCH and PDSCH in an $n+1^{th}$ sub-frame from an $n+1^{th}$ sub-frame to an $n+3^{th}$ sub-frame (S1330).

The SRN may store the decoded PDCCH and PDSCH.

Next, each UE transmits a reply (positive acknowledgement ACK or negative acknowledgement NACK) to the PDSCH received from each eNB in the $n^{th}$ sub-frame (S1340). FIG. 13a illustrates that all the UEs UE1, UE2, and UE3 transmit the NACK to a corresponding eNB. The SRN overhears a reply to the PDSCH transmitted by each UE in the $n+4^{th}$ sub-frame (S1350).

Further, the SRN may determine to which UE transception is possible, that is, which UE is located at a boundary zone of a cell through a reply of the UE, and may accordingly classify UEs within a cell boundary zone.

Next, the SRB performs an operation for avoiding ICI based on the reply to the PDSCH of each UE (S1360). The operation for avoiding ICI is presented as "ICIA" in a drawing, and is performed as illustrated in FIGS. 8 to 12. Since all replies transmitted by eNB to the UEs are NACK in FIG. 13a, the SRN performs a procedure of reallocating a resource with respect to UE1, UE2, and UE3, that is, a procedure of avoiding ICI. The procedure of avoiding the ICI (procedure of reallocating a resource) may refer to a procedure of generating a PDCCH including new resource allocating information for each UE by the SRN.

Next, the SRN transmits an updated PDCCH through the procedure of avoiding the ICI in the $n+6^{th}$ sub-frame to each eNB (S1370). In this case, X2 signaling may be used. Further, the SRN may transmit an ACK signal indicating that the PDCCH transmitted by each eNB to each UE is successively decoded to each eNB together with the updated PDCCH. Accordingly, the eNB may recognize that the PDSCH is retransmitted to each UE together with the SRN.

Next, the eNB transmits the updated PDCCH received from the SRN to each UE in the $n+8^{th}$ sub-frame, and retransmit the PDSCH transmitted to each UE in the $n^{th}$ sub-frame through the updated PDCCH (updated resource block) (S1380). The SRN retransmits the PDSCH signal cooperatively transmitted to each UE with the eNB in the $n+8^{th}$ sub-frame through the updated PDCCH. The UE having successively received the retransmitted signal transmits an ACK in the $n+12^{th}$ sub-frame.

FIG. 13b illustrates an HARQ timing procedure which performs the procedure of avoiding the ICI by the SRN and the eNB, and cooperatively retransmits a downlink signal with the eNB.

A procedure from step S1310 to step S1350 is illustrated in FIG. 13a. Next, the SRN perform an operation for avoiding the ICI based on the reply to the PDSCH of each UE in the $n+12^{th}$ sub-frame (S13605. In this case, the SRN may select a method of transferring information for prevent collision of a resource block to the eNB (second embodiment) and a method of partially processing resource allocating information and transferring the processed information to each eNB by the SRN (third embodiment).

After that, the SRN transmits the PDCCH updated through execution of a procedure of avoiding the ICI to each eNB using X2 signaling (S1370'). In this case, the SRN provides a method of reallocating a collision resource by transferring information for preventing collusion of a resource block allocated to the UE to the eNB or a method of partially processing to prevent the ICI and transferring the processed information to respective eNBs to reallocate the resource. That is, the SRN transmits information operating in the second embodiment of the third embodiment to each eNB.

Each eNB reallocates a resource block through execution of the procedure of avoiding the ICI in the $n+7^{th}$ sub-frame to update the PDCCH (S1375).

Next, each eNB transmits the updated PDCCH to each UE in the $n+8^{th}$ sub-frame, and retransmits the PDSCH signal transmitted to each UE in the $n^{th}$ sub-frame through the updated PDCCH (updated resource block) (S1380). The SRN retransmit the PDSCH signal cooperatively transmitted to each UE in the $n^{th}$ sub-frame with the eNB in the $n+8^{th}$ sub-frame through the updated PDCCH.

The updated PDCCH signal transmitted to the UE in the $n+8^{th}$ sub-frame is a signal for removing or blocking the ICI, and may increase quality of the downlink signal from the eNB to the UE, thereby improving diversity gain in cooperative transmission with the SRN. The UE having successively received the transmitted signal transmits an ACK in the $n+12^{th}$ sub-frame.

FIG. 13c illustrates an HARQ timing procedure which performs a procedure of avoiding ICI by only an SRN, and non-cooperatively retransmits the downlink signal.

Step S1310 to step S1370 are illustrated in FIG. 13a. However, in the $n+1^{th}$ sub-frame, both of the eNB and the SRN retransmit a signal of an $n^{th}$ sub-frame in a case of FIG. 13a, but only the SRN retransmits signal of an $n^{th}$ sub-frame in a case of FIG. 13c (S1380'). Particularly, in a case of the non-cooperative transmission, the SRN transmits the updated PDCCH signal as well as the PDSCH. This is because synchronization between the SRN and the eNB is exact, and each eNB does not transmit PDCCH and PDSCH signals to an UE which has received an ACK from the SRN in the $n+6^{th}$ sub-frame. As a result, although the SRN transmits PDCCH and PDSCH signals to the UE, there is no collision of PDCCH. Since the SRN transmits the PDCCH signal of the eNB in a case of non-cooperative transmission, and transmits the PDCCH signal to a cell ID other than a cell ID of the SRN, the UE may be continuously transparent.

Figure 14A:
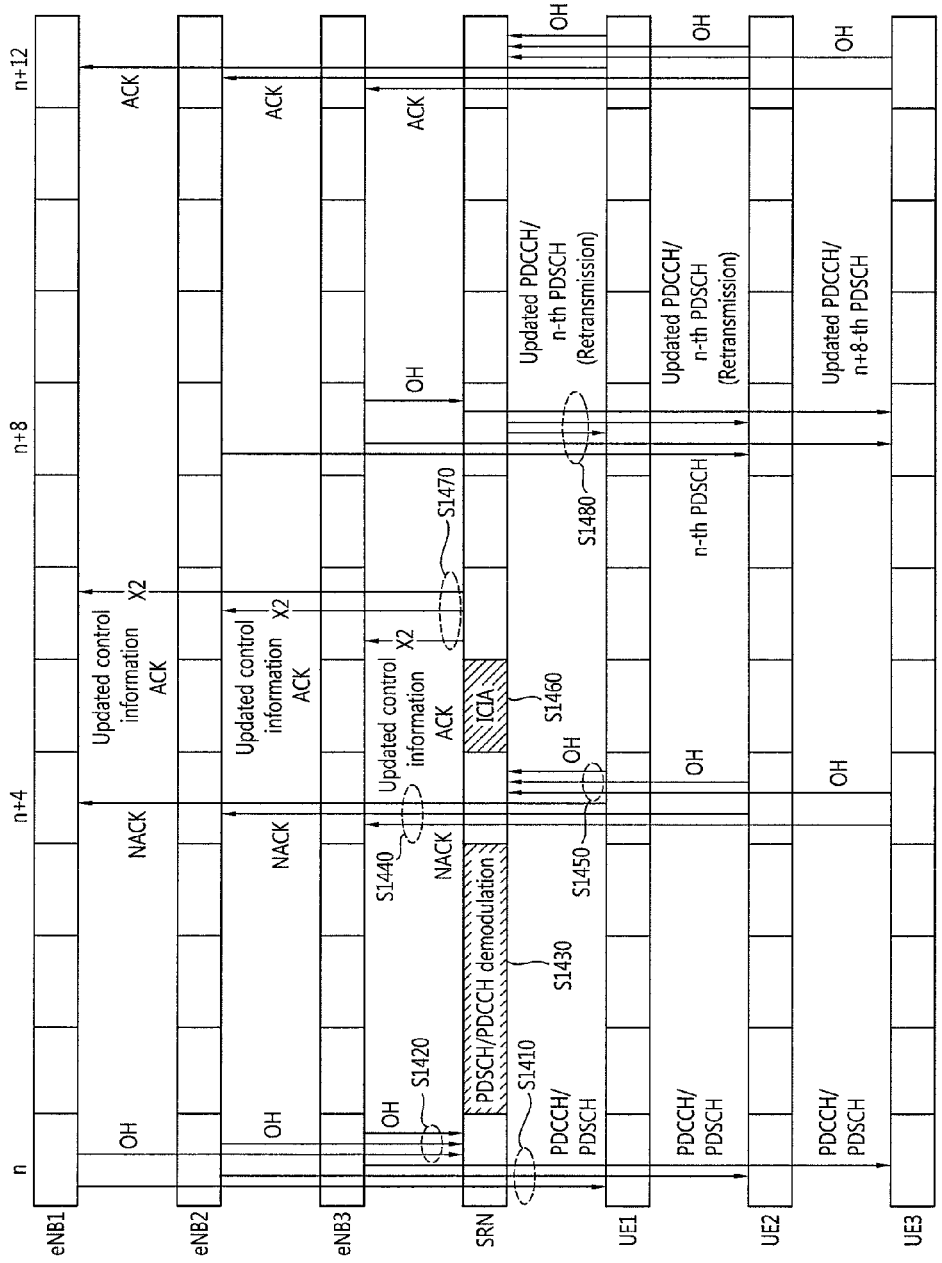
FIGS. 14a and 14b are diagrams illustrating an HARQ timing procedure of an SRN according to another embodiment of the present invention.
Figure 14B:
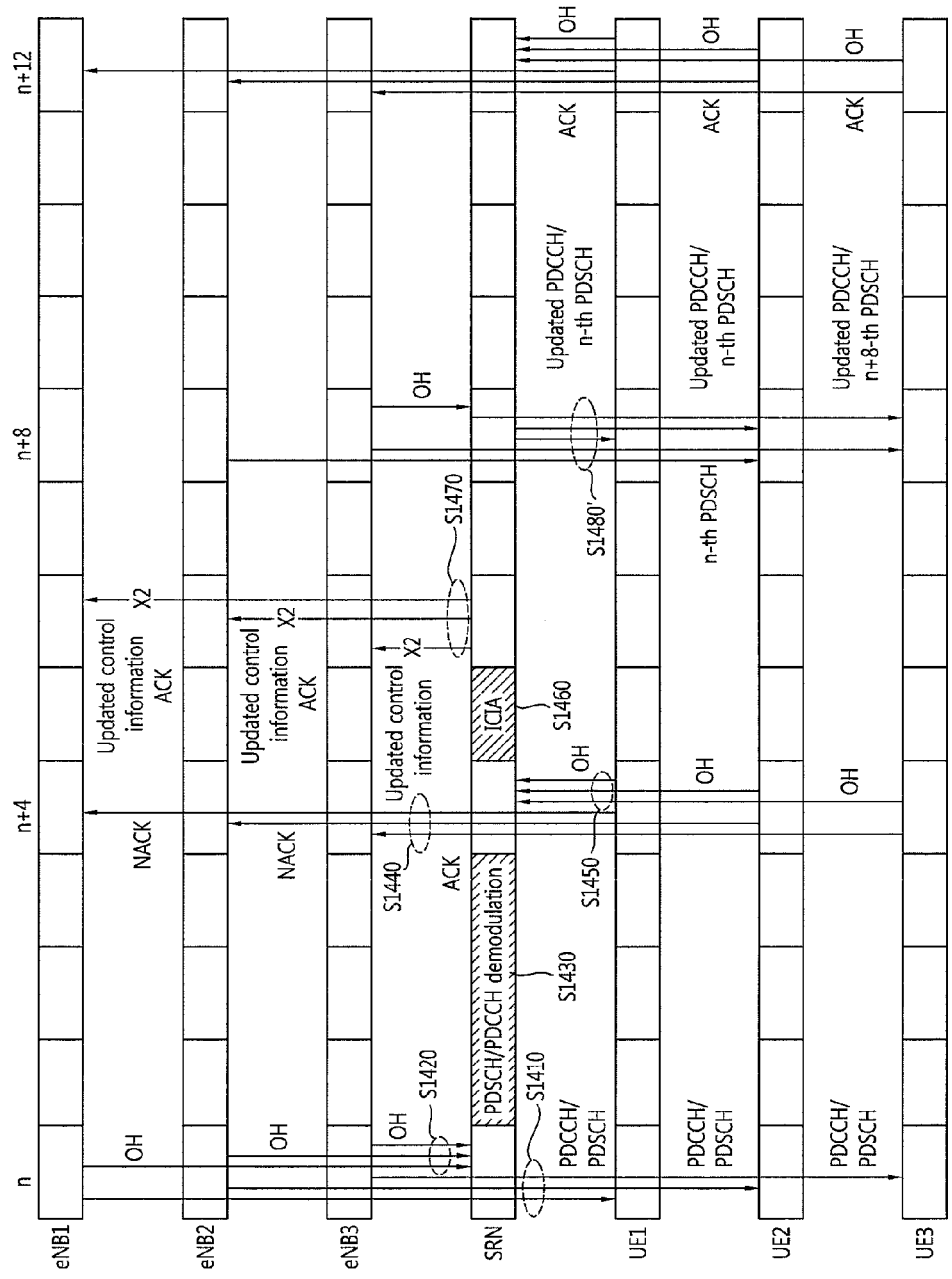

FIGS. 14a and 14b are diagrams illustrating an HARQ timing procedure of an SRN according to another embodiment of the present invention.

FIGS. 14a and 14b illustrate a method of performing the procedure of avoiding the ICI to cooperatively transmit a signal with the eNB when the ICI is created between two eNB-UE links, that is, when the ICI is creased as eNB1-UE1 and eNB2-UE2 use the same resource.

FIG. 14a illustrates an HARQ timing procedure which performs a procedure of avoiding the ICI by only the SRN, and cooperatively retransmits the downlink signal with the eNB.

Step S1410 to step S1460 are performed in the same manner as in step S1310 to step S1360 of FIG. 13a. However, when the UE3 transmits an ACK, the SRN does not transmit an ACK signal to an eNB3 in the $n+6^{th}$ sub-frame, and transmit the PDCCH signal updated through execution of the procedure of avoiding the ICI to each eNB using X2 signaling (S1470). Further, the SRN may transmits an ACK indicating that the updated PDCCH signal and the PDCCH transmitted by respective eNBs to each UE are successively decoded to an eNB1 and an eNB2. Accordingly, the eNB may recognize that the PDSCH signal is transmitted to each UE as well as the SRN.

Next, in the $n+6^{th}$ sub-frame, the eNB1 and the eNB2 transmit the updated PDCCH signal received from the SRN to each UE, and retransmits the PDSCH signal transmitted to each UE in the $n^{th}$ sub-frame through the updated PDCCH (the updated resource block) (S1480). The SRN retransmits the PDSCH signal transmitted to each UE together with the eNB in the $n^{th}$ sub-frame through the updated PDCCH.

Meanwhile, in the n+8$^{th}$ sub-frame, the eNB3 transmits n+8$^{th}$ PDCCH and PDSCH signals to the UE3 which does not re-receive a PDSCH signal of the n$^{th}$ sub-frame from the SRN. In this case, the SRN overhears the PDSCH signal of the n+8$^{th}$ sub-frame of the eNB3. This is because the SRN is considered to be operated as a full duplex.

The UE having successively received the retransmitted signal transmits ACK in the n+12$^{th}$ sub-frame.

FIG. 14b illustrates an HARQ procedure which performs a procedure of avoiding the ICI by only the SRN, and non-cooperatively retransmits the downlink signal.

Steps S1410 to S1470 are performed in the same manner as in steps S1410 to S1470 of FIG. 14a. However, rather than a procedure of FIG. 14a, in a case of FIG. 14b, the eNB1 and the eNB2 do not transmit separate PDCCH and PDSCH signals to a corresponding UE in the n+8$^{th}$ sub-frame, but only the SRN transmits the n$^{th}$ PDSCH signal and the updated PDCCH signal to a corresponding UE (S1480'). The eNB3 having received ACK from the SRN in the n+6$^{th}$ sub-frame simultaneously transmits the PDCCH signal updated in the n+8$^{th}$ sub-frame and a PDSCH signal of the n+8$^{th}$ sub-frame. In this case, in the same manner, it is assumed that the SRN is a full duplex.

Figure 15A:
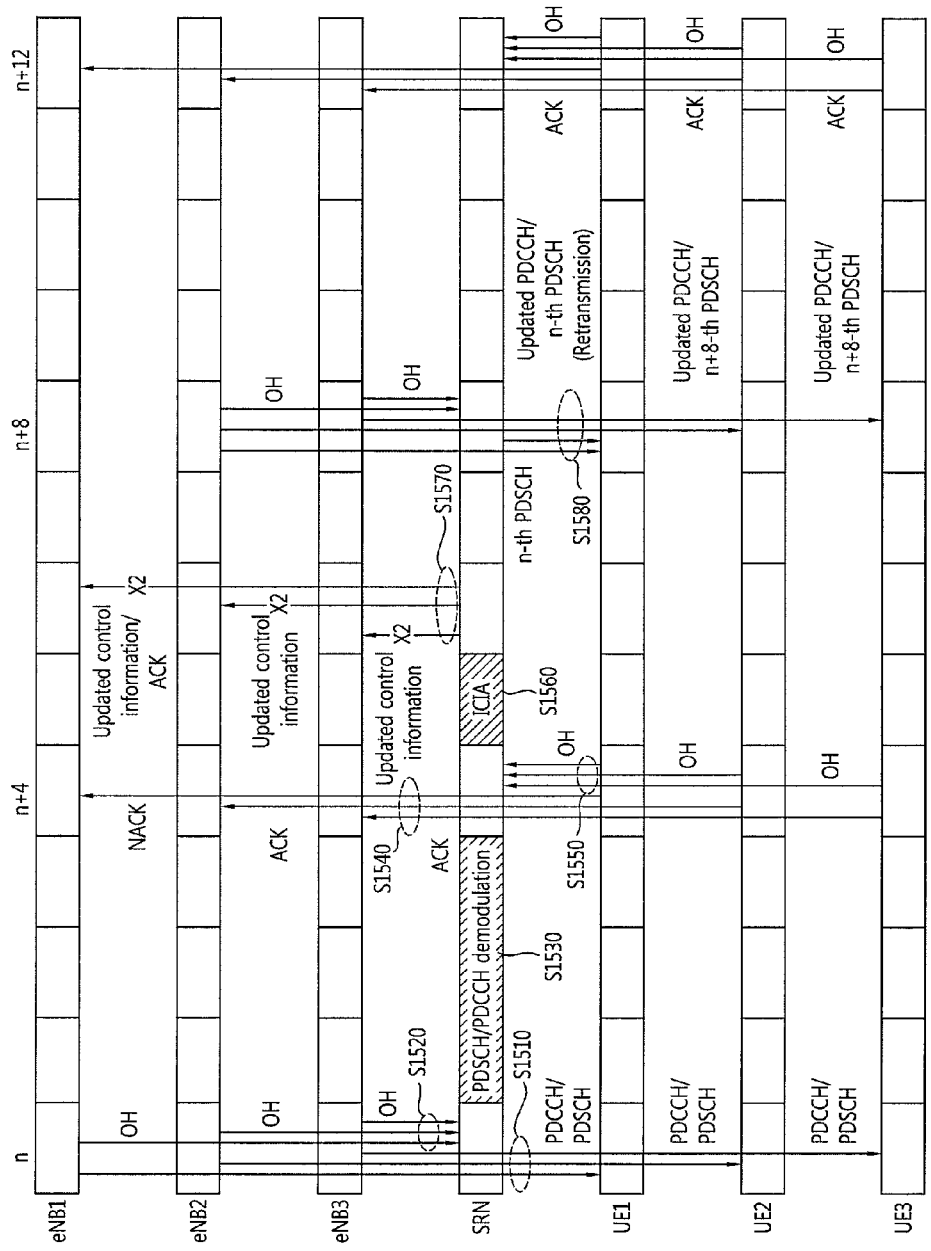
FIGS. 15a and 15b are diagrams illustrating an HARQ timing procedure of an SRN according to still another embodiment of the present invention.
Figure 15B:
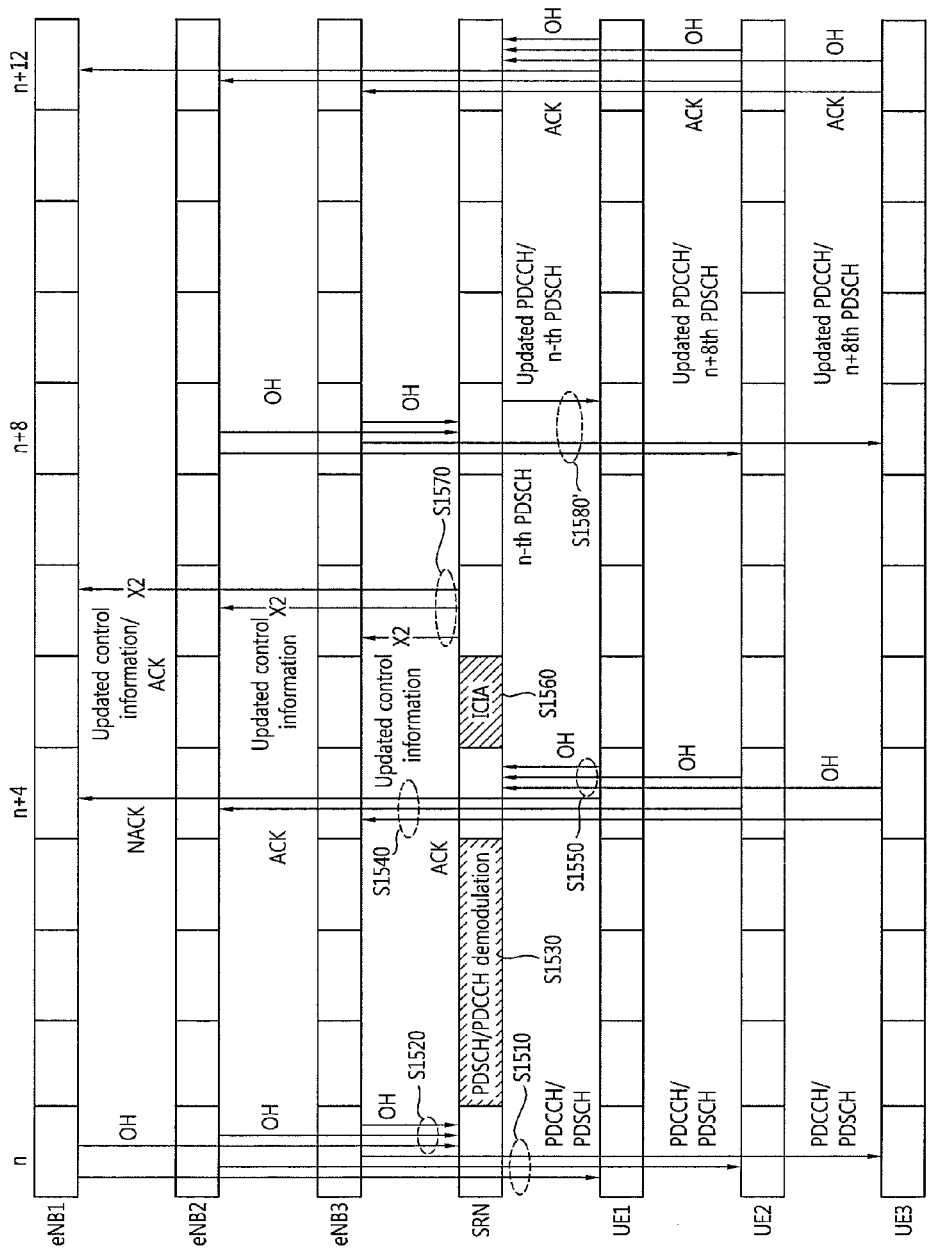

FIGS. 15a and 15b are diagrams illustrating an HARQ timing procedure of an SRN according to still another embodiment of the present invention.

FIGS. 15a and 15b illustrate a method of performing a procedure of avoiding ICI and cooperatively transmitting a signal with an eNB by the SRN when the ICI is created between one eNB-UE link, that is, when only a UE of an eNB1 does not normally receive the signal so that one NACK signal is generated.

FIG. 15a illustrates an HARQ procedure which performs a procedure of avoiding ICI by only the SRN, and cooperatively retransmitting the downlink signal with an eNB.

Steps S1510 to S1560 are performed in the same manner as in steps S1410 to S1460 of FIG. 14a. However, when UEs transmit ACK to an eNB2 and an eNB3, the SRN does not transmit an ACK signal to the eNB2 and the eNB3 in the n+6$^{th}$ sub-frame, and transmits the PDCCH updated through execution of a procedure of avoiding the ICI to each eNB using X2 signaling (S1570). Further, the SRN may transmit an ACK signal indicating that the PDCCH transmitted by each eNB to each UE is successively decoded to an eNB1 together with the updated PDCCH. Accordingly, it is understood that the eNB retransmits the PDSCH to each UE together with the SRN.

Next, in the n+8$^{th}$ sub-frame, the eNB1 transmits the updated PDCCH received from the SRN to the UE1, and retransmits the PDSCH signal transmitted to the UE1 in the n$^{th}$ sub-frame through the updated PDCCH (the updated resource block) (S1580). The SRN retransmits a PDSCH signal cooperatively transmitted to the UE1 in the n$^{th}$ sub-frame together with an eNB1 in the n+8$^{th}$ sub-frame through the updated PDCCH.

Meanwhile, in the n+8$^{th}$ sub-frame, the eNB2 and the eNB3 transmit the n+8$^{th}$ PDCCH and PDSCH signals to the UE2 and the UE3 which do not re-receive the PDSCH signal of the n$^{th}$ sub-frame from the SRN. In this case, the SRN overhears the PDSCH signal of the n+8$^{th}$ sub-frame of the eNB2 and the eNB3. This is because the SRN is considered to be operated as a full duplex.

The UE having successively received the retransmitted signal transmits ACK in the n+12$^{th}$ sub-frame.

FIG. 15b illustrates an HARQ procedure which performs a procedure of avoiding ICI by only the SRN, and non-cooperatively retransmitting the downlink signal.

Steps S1510 to S1570 are performed in the same manner as in steps S1510 to S1570 of FIG. 15a. However, rather than a procedure of FIG. 15a, in the case of FIG. 15b, an eNB1 does not transmit separate PDCCH and PDSCH signals to a corresponding UE in the n+8$^{th}$ sub-frame, but only the SRN transmits the n$^{th}$ PDSCH signal and the updated PDCCH signal (S1580'). The eNB2 and the eNB3 having received ACK from the SRN in the n+6$^{th}$ sub-frame simultaneously transmit the PDCCH signal updated in the n+8$^{th}$ sub-frame and a PDSCH signal of the n+8$^{th}$ sub-frame.

The foregoing embodiments include a combination of constituent elements and characteristics of the present invention. The constituent elements and characteristics must be selectively considered if there is no specific statement. The constituent elements and characteristics may be implemented in the formed that the constituent elements and characteristics do not engage with each other. The embodiment of the present invention may be configured by a combination of some of the constituent elements and characteristics. The order of the operations of the embodiments according to the present invention may be changed. Some of the constituent elements and characteristics of some embodiment may be included in another embodiment, and may be substituted by the constituent elements and characteristics of another embodiment. It will be apparent that the embodiment is configured or new claims may be configured by amendment after application by a combination of claims having no dependent relations.

Although embodiments have been described with reference to a number of illustrative embodiments thereof, it should be understood that numerous other modifications and embodiments can be devised by those skilled in the art that will fall within the spirit and scope of the principles of this disclosure, and variations and modifications can be made to the disclosure without departing from the technical spirit and equivalent scopes of the appended claims of the present invention.

The invention claimed is:

1. A method for operating a relay node (RN) to avoid inter-cell interference (ICI) in a wireless access system, the method comprising:
   overhearing, by the RN, a downlink signal transmitted by a plurality of base stations to terminals within a coverage area of each base station in an n$^{th}$ sub-frame;
   decoding the overheard downlink signal from an n+1$^{th}$ sub-frame to an n+3$^{th}$ sub-frame and sharing the RN through the plurality of base stations,
   wherein n is an integer greater than 0;
   overhearing, by the RN, a response to the downlink signal transmitted by the terminals to each base station in an n+4$^{th}$ sub-frame;
   reallocating, by the RN, a resource block allocated to the terminals in the n$^{th}$ sub-frame if there is at least one negative acknowledgement (NACK) in the responses to the downlink signal transmitted by the terminals,
   wherein the response is a positive acknowledgement (ACK) or a NACK;
   generating, by the RN, control information representing the reallocated resource block;
   transmitting, by the RN, the control information to each base station; and
   transmitting, by the RN in an n+8$^{th}$ sub-frame, the downlink signal transmitted to the terminals in the n$^{th}$ sub-frame, in accordance with the control information.

2. The method of claim 1, wherein the transmitting of the control information to each base station comprises:
   comparing resource blocks allocated to terminals within a coverage area of the RN through the downlink signal with each other to determine whether a collision resource block is included in the resource blocks; and if it is determined that the collision block is included in the resource blocks, reallocating a resource to the collision resource block.

3. The method of claim 2, wherein the reallocating of the resource comprises exchanging the collision resource block for resource blocks to be allocated to terminals outside the coverage area of the RN.

4. The method of claim 3, wherein the exchanging of the collision resource block comprises:

comparing a Signal-to-Interference plus Noise Ratio (SINR) of the collision resource block with SINRs of the resource blocks to be allocated to terminals outside the coverage area of the RN, respectively; and determining a resource block having a smallest difference between the SINRs as a resource block to be exchanged.

5. The method of claim 1, wherein the plurality of base stations comprises three base stations, and wherein the RN comprises a shared RN (SRN) shared by the three base stations.

6. The method of claim 1, wherein the downlink signal transmitted in the $n^{th}$ sub-frame comprises a physical downlink control channel (PDCCH) and a physical downlink shared channel (PDSCH).

7. The method of claim 1, wherein the downlink signal transmitted to the terminals in the $n^{th}$ sub-frame comprises a physical downlink shared channel (PDSCH).

8. The method of claim 1, wherein the RN communicates with the plurality of base stations using X2 signaling.

9. A method for operating a base station (BS) to avoid inter-cell interference (ICI) in a wireless access system, the method comprising:

transmitting, by the BS, a downlink signal to a terminal within a coverage area of the base station in an $n^{th}$ sub-frame, wherein n is an integer greater than 0;

receiving, by the BS, a response to the downlink signal from the terminal in an $n+4^{th}$ sub-frame, wherein the response is a positive acknowledgement (ACK) or a negative acknowledgement (NACK);

receiving, by the BS from a relay node (RN), control information representing that a procedure of reallocating a resource to the terminal transmitting the NACK to the downlink signal is required;

reallocating a resource block allocated in the $n^{th}$ sub-frame to the terminal transmitting the NACK to the downlink signal based on the received control information; and retransmitting, in an $n+8^{th}$ sub-frame, the downlink signal transmitted to the terminal in the $n^{th}$ sub-frame, according to the reallocated resource block, wherein the RN is configured to overhear the response to the downlink signal transmitted by the terminal and generate the control information if the response is the NACK.

10. The method of claim 9, wherein the reallocating of the resource block allocated in the $n^{th}$ sub-frame comprises:

comparing resource blocks allocated to terminals within a coverage area of the RN through the downlink signal with each other to determine whether a collision resource block is included in the resource blocks; and if it is determined that the collision block is included in the resource blocks, reallocating a resource to the collision resource block.

11. The method of claim 10, wherein the reallocating of the resource comprises exchanging the collision resource block for resource blocks to be allocated to terminals outside the coverage area of the RN.

12. The method of claim 11, wherein the exchanging of the collision resource block comprises:

comparing a Signal-to-Interference plus Noise Ratio (SINR) of the collision resource block with SINRs of the resource blocks to be allocated to terminals outside the coverage area of the RN, respectively; and determining a resource block having a smallest difference between the SINRs as a resource block to be exchanged.

13. The method of claim 9, wherein the RN comprises a shared RN (SRN) shared by a plurality of base stations.

14. The method of claim 9, wherein the downlink signal transmitted in the $n^{th}$ sub-frame comprises a physical downlink control channel (PDCCH) and a physical downlink shared channel (PDSCH).

15. The method of claim 9, wherein the downlink signal transmitted to the terminals in the nth sub-frame comprises a physical downlink shared channel (PDSCH).

* * * * *

UNITED STATES PATENT AND TRADEMARK OFFICE
CERTIFICATE OF CORRECTION

| | | |
|---|---|---|
| PATENT NO. | : 9,179,468 B2 | Page 1 of 1 |
| APPLICATION NO. | : 13/990805 | |
| DATED | : November 3, 2015 | |
| INVENTOR(S) | : Hakseong Kim et al. | |

It is certified that error appears in the above-identified patent and that said Letters Patent is hereby corrected as shown below:

ON THE TITLE PAGE:

At item (73), Assignee, change:

"(73) Assignee: LG ELECTRONICS INC., Seoul (KR)"

to:  --(73) Assignees: LG ELECTRONICS INC., Seoul (KR); SUNGKYUNKWAN UNIVERSITY FOUNDATION FOR CORPORATE, Suwon-si, Gyeonggi-Do (KR)--.

Signed and Sealed this
Fifth Day of July, 2016

Michelle K. Lee
*Director of the United States Patent and Trademark Office*